(12) United States Patent
Ohno et al.

(10) Patent No.: US 6,613,170 B1
(45) Date of Patent: Sep. 2, 2003

(54) OPTICAL INFORMATION RECORDING MEDIUM AND ITS MANUFACTURING METHOD AND APPARATUS

(75) Inventors: Eiji Ohno, Osaka (JP); Hidemi Isomura, Osaka (JP); Hideo Matsumoto, Osaka (JP); Kazuhiro Hayashi, Osaka (JP); Kazuya Hisada, Osaka (JP); Kazuo Inoue, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/547,879

(22) Filed: Apr. 12, 2000

(30) Foreign Application Priority Data

Jan. 26, 2000 (JP) ........................................ 2000-016733

(51) Int. Cl.⁷ ............................. B32B 31/28; G11B 7/26
(52) U.S. Cl. ..................... 156/64; 156/74; 156/272.2; 156/275.5; 156/275.7
(58) Field of Search ................. 156/74, 272.2, 156/275.5, 275.7, 64; 369/286; 428/64.4, 65.2

(56) References Cited

U.S. PATENT DOCUMENTS

| | | | | |
|---|---|---|---|---|
| 5,744,193 A | * | 4/1998 | Kitano | .................... 118/52 |
| 5,759,332 A | * | 6/1998 | Itoigawa et al. | |
| 5,843,257 A | * | 12/1998 | Inouchi | .................... 156/285 |
| 5,968,305 A | * | 10/1999 | Maenza | .................... 156/272.8 |
| 6,231,705 B1 | * | 5/2001 | Kanashima et al. | .......... 156/74 |

FOREIGN PATENT DOCUMENTS

| | | | | |
|---|---|---|---|---|
| JP | 8-321074 | | 12/1996 | |
| JP | 09245387 A | * | 9/1997 | ............ G11B/7/26 |
| JP | 10112081 A | * | 4/1998 | ............ G11B/7/26 |
| JP | 2000123427 A | * | 4/2000 | ............ G11B/7/26 |

* cited by examiner

*Primary Examiner*—Michael W. Ball
*Assistant Examiner*—John T. Haran
(74) *Attorney, Agent, or Firm*—Wenderoth, Lind & Ponack, L.L.P.

(57) ABSTRACT

An optical information recording medium is manufactured by bonding a first substrate having a first central bore and a second substrate having a second central bore to each other with radiation cure resin. The radiation cure resin is coated on the first substrate. The first and second substrates are brought into close contact with each other so as to form the first and second substrates integrally with the radiation cure resin. A neighborhood of the first and second central bores is radiated. A whole of at least one of opposite outer faces of the integral first and second substrates is irradiated with radiation so as to wholly cure the radiation cure resin.

31 Claims, 12 Drawing Sheets

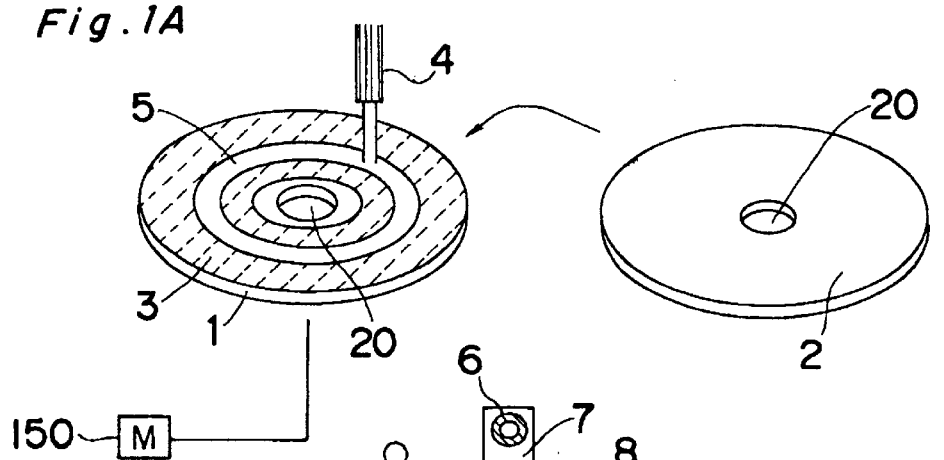
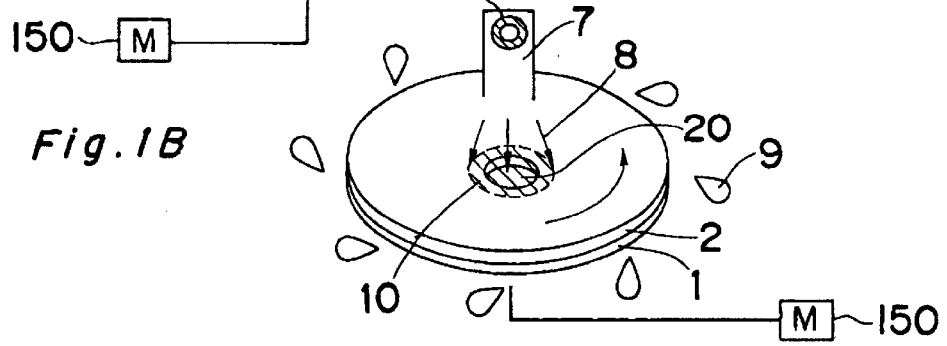
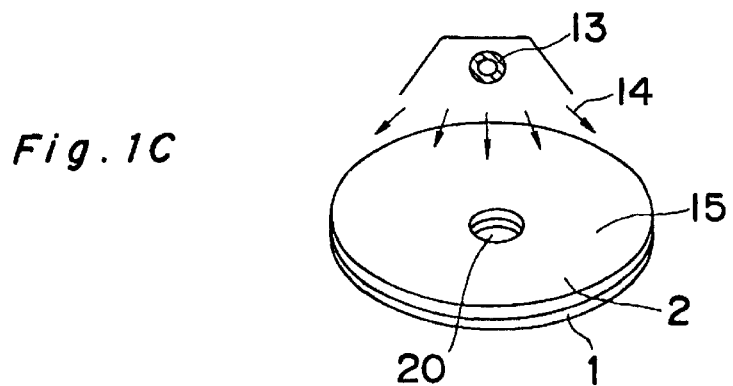
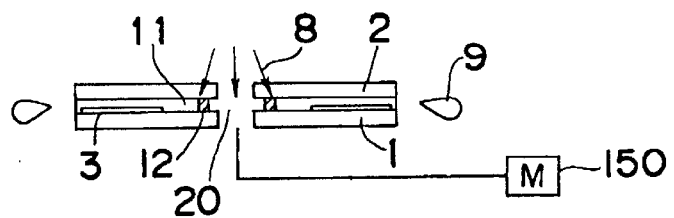

OPTICAL INFORMATION RECORDING MEDIUM AND ITS MANUFACTURING METHOD AND APPARATUS

BACKGROUND OF THE INVENTION

1. Field of the Invention

The present invention relates to a method of apparatus for manufacturing an optical information recording medium.

2. Description of the Prior Art

Technology in which playback and recording of high-density information are performed by using a laser beam is known and is put to practical use mainly as an optical disk. Optical disks can be roughly classified into read-only type, write-once read multiple type and rewritable type. The read-only optical disk is commercially available as a compact disk for recording musical information and a laser disk for recording information on images, while the write-once read multiple type optical disk is commercially available for storing document files and still picture files. Furthermore, the rewritable type optical disk is commercially available for storing data files for a personal computer.

The optical disk usually has an arrangement in which an information layer is provided on a principal face of a transparent resinous substrate of 1.2 mm in thickness and a protective film, such as an overcoat, is provided on the information layer or alternatively, an arrangement in which a protective sheet having the same shape as a substrate is bonded to the substrate.

Meanwhile, in recent years, use of a shorter laser wavelength and an objective lens having a larger numerical aperture (NA) has been studied in order to achieve higher density of the optical disk. However, the shorter wavelength and the larger numerical aperture reduces an allowable value of an angle of inclination, (tilt) of the optical disk relative to a direction of incidence of the laser beam. Reduction of thickness of the substrate is effective for increasing the allowable value of the tilt. For example, in a digital video disk (DVD) having a laser wavelength of 650 nm and a numerical aperture of 0.60, the substrate has a thickness of 0.6 mm. Since mechanical strength of the single substrate of 0.6 mm in thickness is small, the two substrates are bonded to each other such that information recording faces of the substrates confront each other.

In order to bond the two substrates to each other, a method is mainly employed in which radiation cure resin is coated on one substrate, the other substrate is brought into close contact with the one substrate and then, radiation is irradiated over the substrates so as to cure the radiation cure resin. This method is referred to as a "radiation cure method", hereinafter. Meanwhile, ultraviolet (UV) rays are generally used as radiation. Generally in the radiation cure method, radiation cure resin is coated on one substrate annularly by rotating the one substrate at low speed and the other substrate is placed on the one substrate such that the two substrates are formed integrally. Subsequently, after the radiation cure resin has been fully diffused between the two substrates by rotating the two substrates at high speed, radiation is irradiated to the substrates so as to cure the radiation cure resin.

However, in this method, since a position of diffusion of the radiation cure resin to an inner periphery of the substrates changes based on a position of coating of the radiation cure resin, a timing of placing the substrates on each other, high-speed rotational conditions of the substrates, etc., it is difficult to stop the resin at a predetermined radial position of the substrates. In a case where the resin is excessively diffused to the inner periphery of the substrates, the resin protrudes into central bores of the substrates. If the resin is cured in this state, the substrates become eccentric relative to a turntable when mounted on the turntable. Therefore, in this case, the resin should be cured after having been wiped from the central bores of the substrates. Meanwhile, in a case where the resin is insufficiently diffused to the inner periphery of the substrates, a disk clamp area of the substrates, which is used for clamping the substrates to the turntable, is not filled with the resin and thus, the mechanical strength of the optical disk becomes small.

In order to solve this problem, Japanese Patent Laid-Open Publication No. 8-321074 (1996) proposes that a stopper for preventing the radiation cure resin from protruding into the central bores is provided at an innermost periphery of the substrate. For example, an annular recess is formed at an inner peripheral side of the disk clamp area on at least one of opposed faces of the substrates. Thus, when the resin has been diffused to the inner periphery of the substrates, the resin is received in the recess acting as a resin reservoir and therefore, is prevented from being diffused further to the inner periphery of the substrates. Namely, even if the resin is filled in the disk clamp area, the resin does not protrude into the central bores of the substrates. Accordingly, it is possible to stably manufacture an optical disk having a large mechanical strength.

In order to manufacture an optical disk, a method is generally known in which two substrates are bonded to each other with ultraviolet (UV) cure resin. This method has such features that (1) since air bubbles or the like are not contained in the resin, an external appearance of the optical disk is good and (2) since the resin is instantaneously cured upon irradiation of UV rays thereto, working efficiency is excellent and tact time can be shortened.

Further, thin substrates represented by the DVD have been used in recent years. Since the mechanical strength of the thin substrate is small, it is desirable that the thin substrates are bonded to each other by filling the resin also in the disk clamp area of the substrates so as to be formed integrally. To this end, the UV cure resin should be coated on a neighborhood of the central bores of the substrates.

However, it has been difficult to stop the resin at a predetermined radial position of the substrate at all times. This is because diffusion speed of the UV cure resin to an inner periphery of the substrates changes based on a position of coating of the UV cure resin, timing of bonding of the substrates, rotational conditions of the substrates, change of viscosity of the UV cure resin due to temperature changes, etc. In a case where the resin is excessively diffused to an inner periphery of the substrates, the resin protrudes into the central bores of the substrates. If the resin is cured in this state, the substrates become eccentric relative to a turntable when mounted on the turntable. Therefore, in this case, the resin should be cured after having been wiped from the central bores of the substrates. Meanwhile, in a case where the resin is insufficiently diffused to the inner periphery of the substrates, the resin is not filled in the disk clamp area of the substrates and thus, mechanical strength of the optical disk becomes small as described above.

Meanwhile, Japanese Patent Laid-Open Publication No. 8-321074 (1996) discloses a method in which the radiation cure resin is filled in the disk clamp area stably without projecting into the central bores of the substrates. However, in this prior art document, it is essential that the stopper is provided on the substrate. In order to form the stopper on the substrate, a method in which an annular protuberance is provided on the substrate by printing or a method in which an annular recess is provided on the substrate by cutting the substrate is disclosed. At any rate, it is necessary to provide a step of working the substrate. However, the provision of the step of working the substrate results in adherence of dust thereto and rise of production cost.

Meanwhile, it is also possible to form the stopper on the substrate preliminarily. However, in a case where the substrate is manufactured by, for example, transfer from a stamper, optical characteristics of the substrate and properties of transfer from the stamper to the substrate may be adversely affected by the stopper. Namely, if an annular protuberance is provided on the stamper or a stamper holder, an annular recess acting as the stopper is formed on the substrate. However, in a case of an optical information recording medium, especially an optical disk, the substrate is manufactured by injection molding. Thus, if the protuberance is preliminarily provided on the stamper, flow of the resin at the time of molding of the substrate is different from that in a case where the protuberance is not provided on the stamper, so that double refraction and formation of signal recording pits and signal recording grooves of the manufactured substrate may be insufficient. Furthermore, in a case where a position of the stopper is required to be changed, the position of the protuberance on the stamper or the stamper holder should also be changed. As a result, it has been practically difficult to control resinous filling to an arbitrary position.

Meanwhile, in the case where the two substrates are bonded to each other such that the information recording faces of the substrates confront each other as described above, an optical disk in which a reflective layer made of aluminum or the like, as in prior art, is formed on the information recording face of one of the substrates and a thin translucent reflective layer made of gold or the like, is formed on the information recording layer of the other of the substrates such that playback on the two information recording faces is performed from the substrate having the translucent reflective layer is proposed and put to practical use. Another optical disk formed by the two substrates is also proposed in which not the metallic reflective layer, but a thin rewritable recording layer is formed on the information recording layer.

Furthermore, in order to achieve higher density, the use of a bluish purple laser beam source having a wavelength of about 400 nm is also proposed. In this case, an arrangement of the two substrates can be obtained in the same manner as described above.

In the DVD, the substrate has a thickness of 0.6 mm. However, a method is also proposed in which the substrate is set at a thickness of about 0.1 mm and a quite minute laser beam spot is formed by using a lens having an NA of about 0.85, so as to perform recording and playback of signals. Since it is difficult to provide a signal recording layer on the substrate of 0.1 mm in thickness, a thin translucent sheet is generally bonded, by using UV cure resin, to a substrate of about 1.1 mm in thickness, which is provided with the signal recording layer, such that recording or playback of signals is performed from the sheet. At this time, a sum of a thickness of the sheet and that of the UV cure resin is designed to reach 0.1 mm.

In order to bond the substrates to each other, there is a method in which UV cure resin is coated on one substrate, the other substrate is brought into close contact with the one substrate and then, UV rays are irradiated on the substrate so as to cure the UV cure resin. Generally in this method, the UV cure resin is annularly coated on the one substrate by rotating the one substrate at low speed and the other substrate is placed on the one substrate such that the two substrates are formed integrally. Subsequently, after the UV cure resin has been fully diffused and spread between the two substrates by rotating the substrates at high speed, UV rays are irradiated to the substrates so as to cure the UV cure resin.

However, in this conventional method, thickness of the UV cure resin varies based on a position of coating of the UV cure resin, timing of placing the substrates on each other, high-speed rotational conditions of the substrates, etc. These variations take place not only between optical disks, but in one optical disk. Generally, since the UV cure resin is spread by centrifugal force produced by high-speed rotation of the substrates, the thickness of the UV cure resin is small at an inner periphery of the substrates but is large at an outer periphery of the substrates. Such distribution of thickness of the UV cure resin poses a problem in a case where recording or playback is performed through a layer of the UV cure resin. Namely, in the case where recording or playback is performed from one of the two substrates bonded to each other or the thin translucent sheet is bonded, by using the UV cure resin, to the substrate having the signal recording layer such that recording and playback of signals are performed from the sheet. Namely, since variations of thickness of the UV cure resin result in variations of an optical path length of a laser beam, a shape of a laser beam spot on the signal recording layer varies, thereby resulting in variations of recording and playback characteristics. This adverse effect becomes greater in a case where the laser beam spot is reduced in diameter. Namely, in a case where a bluish purple laser beam is employed as the laser beam or an objective lens having an NA as large as 0.85 is used.

SUMMARY OF THE INVENTION

Accordingly, a first object of the present invention is to provide, with a view towards eliminating the above-mentioned drawbacks of prior art, a method of and an apparatus for manufacturing an optical information recording medium, in which filling of resin at an innermost periphery of substrates can be controlled to an arbitrary position, regardless of whether or not a stopper is provided at the innermost periphery of the substrates, is or regardless of a position of the stopper, whereby an optical disk having a high mechanical strength and good external appearance, in which a filling position of the resin at the innermost periphery of the substrates is fixed, can be manufactured at high yield and at low cost.

A second object of the present invention is to provide a method and an apparatus of the above described type, in which a layer of UV cure resin has uniform thickness, such that recording and playback characteristics do not vary even when the recording or playback of signals is performed through the layer of UV cure resin.

In order to accomplish the first object of the present invention, a method of manufacturing an optical information recording medium, in which a first substrate having a first central bore and a second substrate having a second central bore are bonded to each other through radiation cure resin, according to the present invention comprises the steps of coating the radiation cure resin on the first substrate, bringing the first and second substrates into close contact with each other through the radiation cure resin so as to form the first and second substrates integrally, irradiating radiation to a neighborhood of the first and second central bores, and irradiating radiation to a whole of at least one of opposite outer faces of the integral first and second substrates so as to cure the radiation cure resin wholly.

Meanwhile, in order to accomplish the second object of the present invention, a method of manufacturing an optical information recording medium, including a disklike first substrate having a signal recording layer formed on one principal face thereof and a disklike second substrate, according to the present invention comprises the steps of bringing the first and second substrates into close contact with each other through radiation cure resin such that the signal recording layer is disposed between the first substrate and the radiation cure resin, rotating the first and second substrates while the first and second substrates are being held in close contact with each other so as to form the first and second substrates integrally, irradiating radiation to an inner peripheral region of the integral first and second substrates so as to cure a portion of the radiation cure resin, continuing the rotation of the first and second substrates so as to spread the radiation cure resin between the first and second substrates, and irradiating radiation so as to cure the radiation cure resin wholly.

BRIEF DESCRIPTION OF THE DRAWINGS

These objects and features of the present invention will become apparent from the following description taken in conjunction with the preferred embodiments thereof with reference to the accompanying drawings in which:

FIGS. 1A, 1B and 1C are perspective views showing steps of a method of manufacturing an optical information recording medium, according to a first embodiment of the present invention;

FIG. 2 is a sectional view of FIG. 1B;

DETAILED DESCRIPTION OF THE INVENTION

Figure 3A:
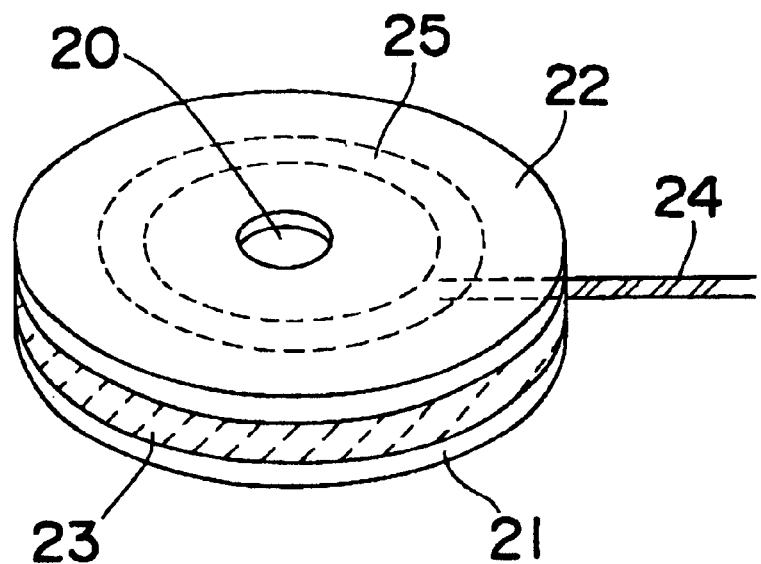
FIG. 3A is a perspective view showing a step of a modification of the method of FIG. 1.

Before the description of the present invention proceeds, it is to be noted that like parts are designated by like reference numerals throughout several views of the accompanying drawings.

Hereinafter, embodiments of the present invention are described with reference to the drawings.

First Embodiment

Here, a method in which when UV cure resin is diffused between two substrates, a filling position of the UV cure resin at an innermost periphery of the substrates is controlled by irradiating UV rays only to an innermost peripheral region of the substrates, according to a first embodiment of the present invention is described with reference to FIGS. 1A–2. In FIG. 1A, substrates 1 and 2 are identical with each other and each of the substrates 1 and 2 is a polycarbonate substrate produced by injection molding and having a thickness of 0.6 mm and a diameter of 120 mm. A central bore 20 of each of the substrates 1 and 2 has a diameter of 15 mm. Information signals are preliminarily recorded as pits on one face of each of the substrates 1 and 2, which act as a signal recording faces. A reflective layer 3, mainly consisting of aluminum and having a thickness of about 100 nm, is provided on the signal recording face of the substrate 1. Thus, by irradiating a laser beam from the other face of the substrate 1, playback of the information signals can be performed. The substrate 2 is a dummy substrate which is bonded to the substrate 1, so as to increase its mechanical strength. A reflective layer is not provided on the dummy substrate 2.

Initially, UV cure resin 5 is dripped from a nozzle 4 so as to be coated on the reflective layer 3 of the substrate 1 annularly by rotating the substrate 1 at low speed, for example, at 20 to 120 rpm with a motor 150. Alternatively, the nozzle 4 may also be rotated and the substrate 1 fixed. Then, the dummy substrate 2 is brought into close contact with the substrate 1 such that not only the central bores 20 of the substrates 1 and 2 are made concentric with each other, but the signal recording faces of the substrates 1 and 2 confront each other.

Thereafter, owing to a weight of the dummy substrate 2 and capillarity, UV cure resin 11 is diffused between the substrates 1 and 2 as shown in FIG. 2. At this time, if the substrates 1 and 2 are rotated at high speed, for example, at 300 to 6000 rpm by the motor 150, diffusion of the UV cure resin 11 to an outer periphery of the substrates 1 and 2 is accelerated and thus, tact time can be reduced greatly. Meanwhile, it has also been proved that a thickness of the UV cure resin 11 at the time the substrates 1 and 2 are rotated at high speed can be made more uniform than that at the time the substrates 1 and 2 are not rotated. An excessive portion of the UV cure resin 11 is expelled as droplets 9 from the outermost periphery of the substrates 1 and 2 by centrifugal force of the high-speed rotation of the substrates 1 and 2, as shown in FIGS. 1B and 2.

Further, the UV cure resin 11 is also diffused to an inner periphery of the substrates 1 and 2. The present invention is characterized by a method of accurately controlling a position for stopping this diffusion of the UV cure resin 11 to the inner periphery of the substrates 1 and 2. This method is described with reference to FIGS. 1B and 2. When the substrates 1 and 2 are rotated at a high speed by the motor 150, UV rays 8 are irradiated by a UV lamp 6 only to a UV irradiation region 10, i.e. a region of the substrate 2, which is disposed radially inwardly of an innermost peripheral position for stopping diffusion of the UV cure resin 11. By changing a height and size of a UV shielding cover 7 for shielding the UV rays 8 of the UV lamp 6, the UV irradiation region 10 can be arbitrarily controlled regardless of a shape of the substrates 1 and 2.

When the UV cure resin 11 has reached the UV irradiation region 10 through its diffusion to the inner periphery of the substrates 1 and 2 upon close contact of the substrate 2 with the substrate 1, the UV cure resin 11 is cured by the UV rays 8 and thus, further diffusion of the UV cure resin 11 to the inner periphery of the substrates 1 and 2 is stopped. As a result, an annular cured region 12 in which the UV cure resin 11 is cured is formed at innermost periphery of the substrates 1 and 2.

Speed of diffusion of the UV cure resin 11 to the inner periphery of the substrates 1 and 2 is not constant at all times, but varies according to minute changes of viscosity of the UV cure resin 11 and the shape of the substrates 1 and 2. However, if the UV irradiation region 10 is made concentric with the central bores 20 of the substrates 1 and 2, the diffusion of the UV cure resin 11 is stopped at a boundary of the UV radiation region 10 at all times. Therefore, the UV cure resin 11 can be filled at inner periphery of the substrates 1 and 2 stably, so that not only stable mechanical strength can be secured but good external appearance can be obtained.

After the UV cure resin 11 has been fully diffused between the substrates 1 and 2, UV rays 14 are irradiated to a whole of the substrate 2 by a UV lamp 13, as shown in FIG. 1C, so as to cure the UV cure resin 11 wholly, so that bonding of the substrates 1 and 2 is completed and thus, an optical disk 15 is obtained.

Figure 3B:
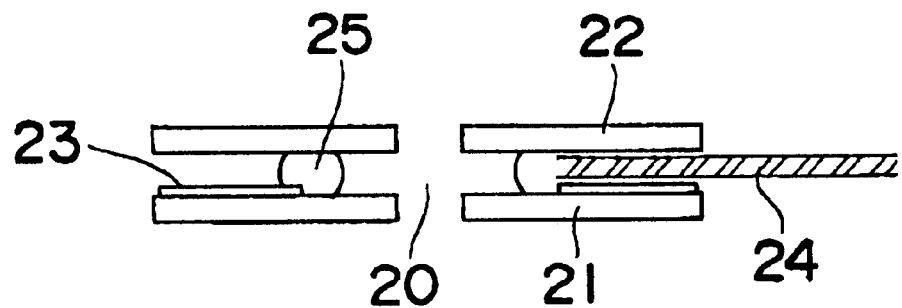
FIG. 3B is a sectional view of FIG. 3A.

Meanwhile, in the first embodiment, the UV cure resin 5 is dripped from the nozzle 4 so as to be coated on the substrate 1 annularly and then, the substrate 2 is brought into contact with the substrate 1, such that not only the central bores 20 of the substrates 1 and 2 are made concentric with each other, but the signal recording faces of the substrates 1 and 2 confront each other. A modification of the method of the first embodiment is described with reference to FIGS. 3A and 3B. In this modification, a substrate 21 having a reflective layer 23 formed thereon and a dummy substrate 22 are caused to confront each other with a minute gap formed therebetween, beforehand. A needlelike dispenser 24 is inserted into the gap and UV cure resin 25 is filled annularly between the substrates 21 and 22 by the dispenser 24, while the substrates 21 and 22 are being rotated at low speed. Then, the substrates 21 and 22 are brought into close contact with each other so as to be formed integrally. In the method of the first embodiment, if the substrate 2 is brought into close contact with the substrate 1 rapidly, air bubbles may penetrate in between the substrate 2 and the UV cure resin 11. However, in this modification, since the UV cure resin 25 is filled between the substrates 21 and 22 by the dispenser 24, the penetration of air bubbles in between the substrates 21 and 22 does not take place and thus, such an advantage is obtained that tact time for bonding the substrates 21 and 22 to each other can be shortened.

Another modification of the method of the first embodiment is described with reference to FIG. 4. In this modification, when UV cure resin 38 is diffused between substrates 31 and 32, by rotating the substrates 31 and 32 at high speed after the substrates 31 and 32 have been brought into close contact with each other, the UV cure resin 38 is sucked from the central bores 20 of the substrates 31 and 32. More specifically, after the substrate 31 having a reflective layer 33 formed thereon and the dummy substrate 32 have been brought into close contact with each other, the substrates 31 and 32 are mounted on a boss 35 having a suction port 34. In this case, the suction port 34 is set so as to be located at a level of a gap between the substrates 31 and 32. The UV cure resin 38 is diffused between the substrates 31 and 32 by rotating the integral substrates 31 and 32 at high speed. At this time, a suction pump 36 is actuated and sucks the UV cure resin 38 from the suction port 34 so as to diffuse the UV cure resin 38 to inner periphery of the substrates 31 and 32. Also in this modification, since UV rays 37 are irradiated to an innermost peripheral region of the substrates 31 and 32, an annular cured region 39 in which the UV cure resin 38 is formed. In this modified method, since the UV cure resin 38 is diffused also to inner periphery of the substrates 31 and 32 in a short period, tact time for bonding the substrates 31 and 32 to each other can be shortened.

Figure 5A:
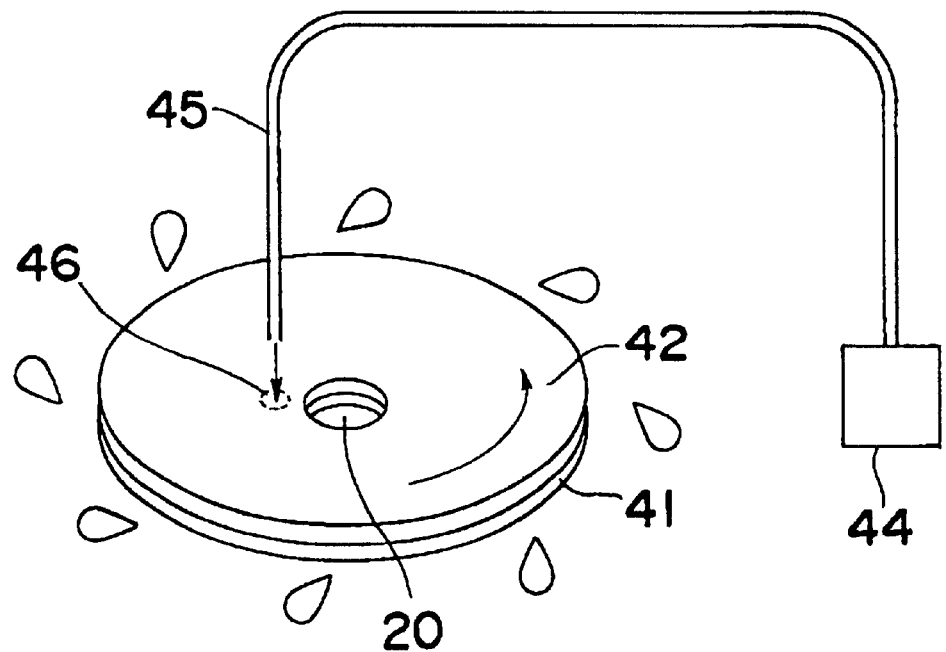
FIG. 5A is a perspective view showing a step of a further modification of the method of FIG. 1.
Figure 5B:
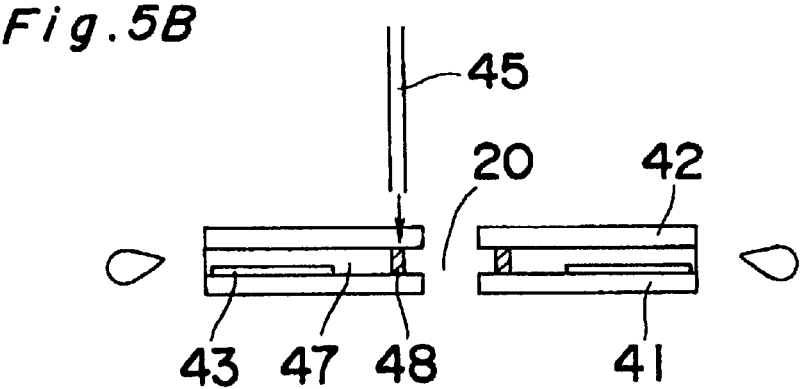
FIG. 5B is a sectional view of FIG. 5A.

Meanwhile, in the first embodiment, at the time of diffusion of the UV cure resin 11, the UV rays 8 are irradiated to the innermost peripheral region of the substrates 1 and 2 concentrically with the central bores 20 of the substrates 1 and 2 by the UV lamp 6 provided immediately above a center of the substrate 2. A further modification of the method of the first embodiment is described with reference to FIGS. 5A and 5B. In this modification, a UV spot light 46 is irradiated to an inner peripheral spot of substrates 41 and 42 while the substrates 41 and 42 are being rotated. More specifically, after the substrate 41 having a reflective layer 43 formed thereon and the dummy substrate 42 have been brought into close contact with each other, the substrates 41 and 42 are rotated at high speed so as to diff-use UV cure resin 47. At this time, UV rays produced by a UV light source 44 are guided by an optical fiber 45 so as to be irradiated as the UV spot light 46 to the inner peripheral spot of the substrates 41 and 42. Therefore, a UV irradiation region of the UV spot light 46 is a spot. However, since the substrates 41 and 42 are rotated, the UV cure resin 47 proceeding to inner periphery of the substrates 41 and 42 is cured at a radial position of the substrate 42, where the UV spot light 46 is irradiated and thus, an annular cured region 48 in which the UV cure resin 47 is cured, is formed. In this modified method, by merely changing the radial position of the UV spot light 46 on the substrate 42, position for stopping diffusion of the UV cure resin 47 to the inner periphery of the substrates 41 and 42 can be easily controlled. Furthermore, the optical fiber 45 can be introduced into a narrow space. Hence, in a bonding device, a coating section for coating the UV cure resin 47 or a diffusion section for diffusing the UV cure resin 47 can be restrained to a size substantially equal to that of prior art.

Figure 6:
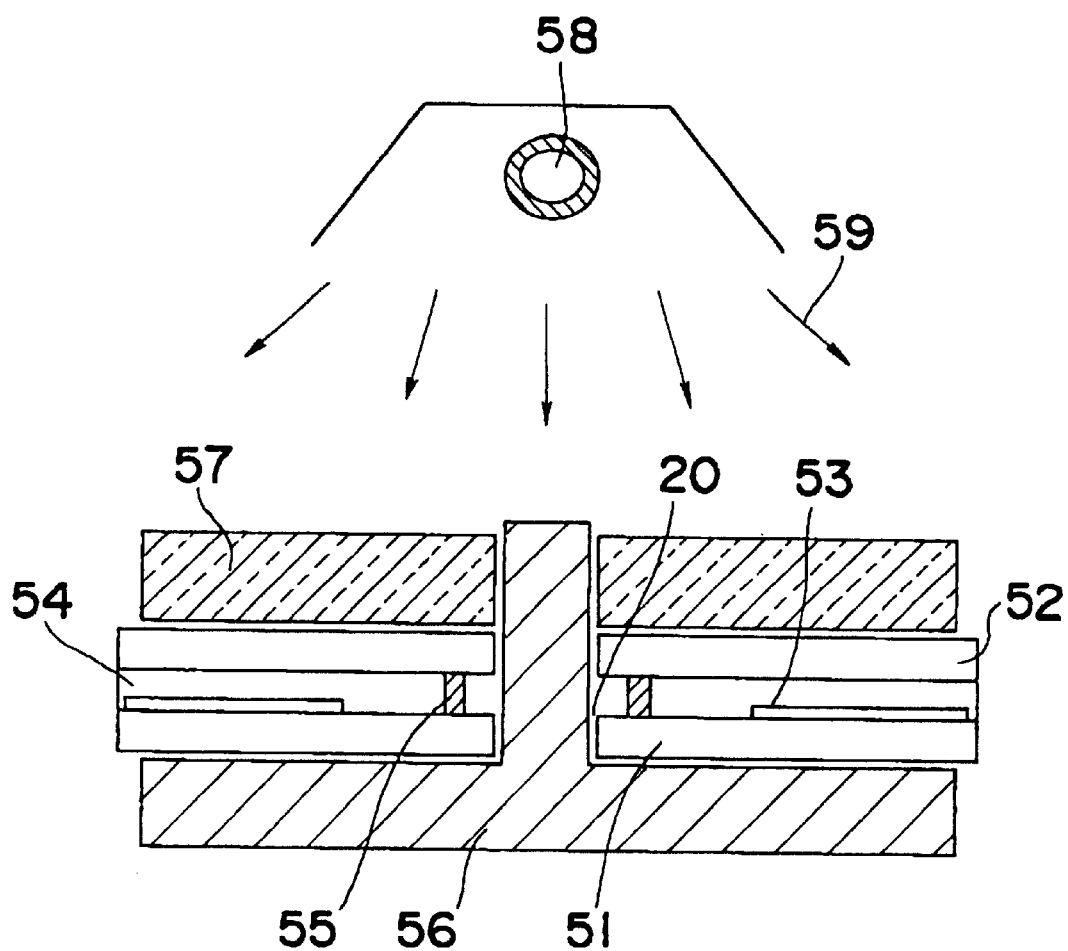
FIG. 6 is a sectional view showing a step of a still a further modification of the method of FIG. 1.

A still further modification of the method of the first embodiment is described with reference to FIG. 6. In this modification, when UV rays 59 are irradiated to a whole of a substrate 52, so as to wholly cure UV cure resin 54 after the UV cure resin 54 has been fully diffused between substrates 51 and 52, the integral substrates 51 and 52 are gripped between two flat plates, e.g. a substrate holder 56 and a transparent disk-like glass plate 57 so as to be subjected to a load. More specifically, the UV cure resin 54 is already filled between the substrate 51 having a reflective layer 53 formed thereon and the dummy substrate 52. In the method of the present invention, since the UV cure resin 54 is diffused between the substrates 51 and 52 while UV rays are being irradiated to an innermost peripheral region of the substrate 52, an annular cured region 55 in which the UV cure resin 54 is cured is formed at a boundary of the innermost peripheral region of the substrate 52. In this state, the substrates 51 and 52 are placed on the substrate holder 56 and then, the glass plate 57 is placed on the substrates 51 and 52 so as to apply the load to the substrates 51 and 52 such that tilt of the substrates 51 and 52 is reduced for correction. Since UV rays are transmitted through the glass plate 57, the UV rays 59 are irradiated to the whole of the substrate 52 from above the glass plate 57 by a UV lamp 58, so as to wholly cure the UV cure resin 54. A tilt of a thus obtained optical disk is made smaller than that in the case where a load is not applied to the substrates 51 and 52. This effect of reducing tilt of the optical disk becomes greater as the substrates 51 and 52 became thinner.

Second Embodiment

Figure 7A:
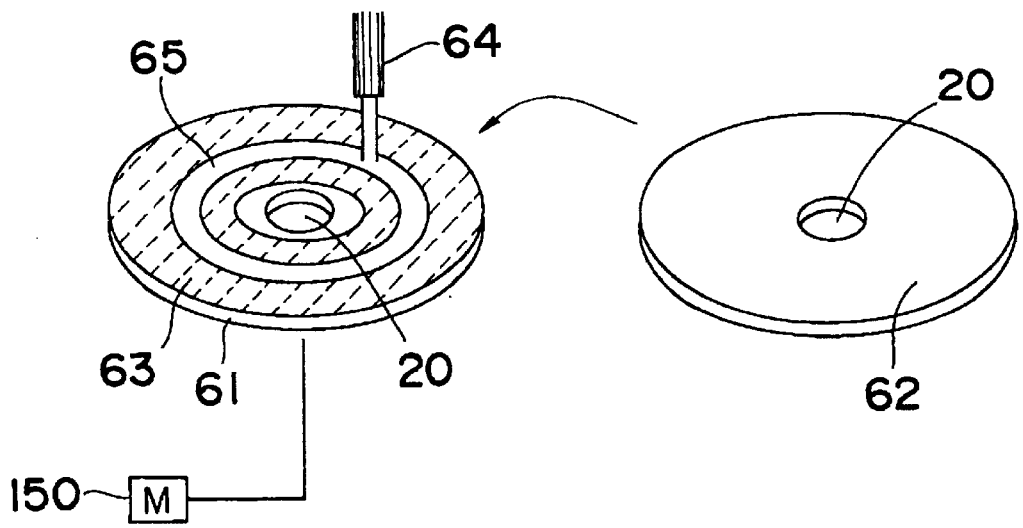
FIGS. 7A, 7B, 7C and 7D are views showing steps of a method of manufacturing an optical information recording medium, according to a second embodiment of the present invention.

A method in which when UV cure resin is diffused between two substrates, a filling position of the UV cure resin at an innermnost periphery of the substrates is controlled by providing a detection means or detector for detecting a presence and absence of diffusion of the UV cure resin according to a second embodiment of the present invention, is described with reference to FIGS. 7A–9B. In FIG. 7A, substrates 61 and 62 are identical with each other and each of the substrates 61 and 62 is a polycarbonate substrate produced by injection molding and having a thickness of 0.6 mm and a diameter of 120 mm. A central bore 20 of each of the substrates 61 and 62 has a diameter of 15 mm. Information signals are preliminarily recorded as pits on one face of each of the substrates 61 and 62, which act as signal recording faces. A reflective layer 63 mainly consisting of aluminum and having a thickness of about 100 nm is provided on the signal recording face of the substrate 61. Thus, by irradiating a laser beam from the other face of the substrate 61, playback of the information signals can be performed. The substrate 62 is a dummy substrate which is bonded to the substrate 61, so as to increase its mechanical strength. A reflective layer is not provided on the dummy substrate 62.

Initially, UV cure resin 65 is dripped from a nozzle 64 so as to be coated on the reflective layer 63 of the substrate 61 annularly by rotating the substrate 61 at low speed, for example, at 20 to 120 rpm with the motor 150. Alternatively, the nozzle 64 may also be rotated and the substrate 61 fixed. Then, the dummy substrate 62 is brought into close contact with the substrate 61 such that not only the central bores 20 of the substrates 61 and 62 are made concentric with each other, but the signal recording faces of the substrates 61 and 62 confront each other.

Figure 7B:
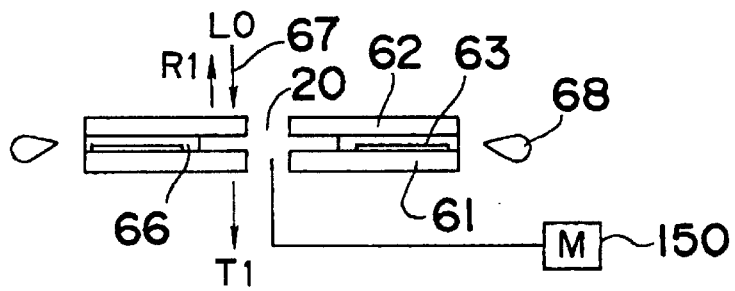

Thereafter, owing to a weight of the dummy substrate 62 and capillarity, UV cure resin 66 is diffused between the substrates 61 and 62. At this time, if the substrates 61 and 62 are rotated at high speed, for example, at 300 to 6000 rpm by the motor 150, diffusion of the UV cure resin 66 to an outer periphery of the substrates 61 and 62 is accelerated and thus, tact time can be reduced greatly. Meanwhile, it has also been proved that thickness of the UV cure resin 66 at the time the substrates 61 and 62 are rotated at high speed can be made more uniform than that at the time the substrates 61 and 62 are not rotated. An excessive portion of the UV cure resin 66 is expelled as droplets 68 from the outermost periphery of the substrates 61 and 62 by centrifugal force of the high-speed rotation of the substrates 61 and 62 as shown in FIG. 7B.

Figure 7C:
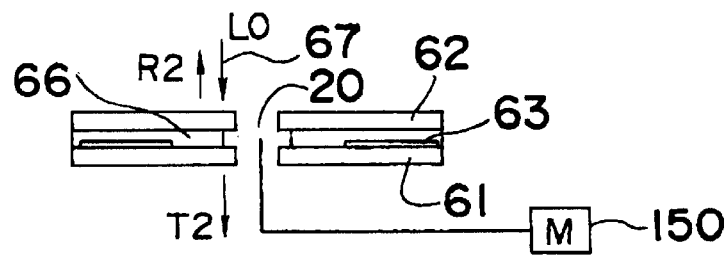
Figure 7D:
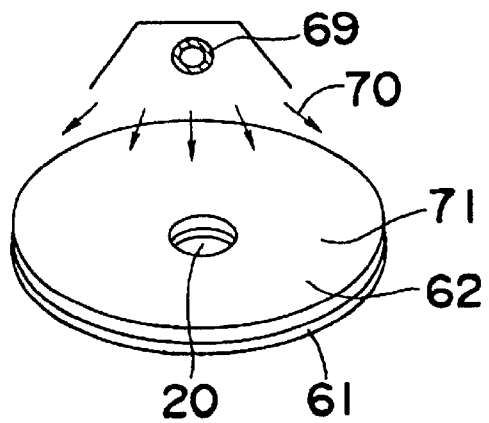

Further, the UV cure resin 66 is also diffused to an inner periphery of the substrates 61 and 62. In the second embodiment, a detection means or detector for detecting this diffusion of the UV cure resin 66 to the inner periphery of the substrates 61 and 62 is provided. Thus, when the detection means has detected that the UV cure resin 66 is diffused to an innermost peripheral position for stopping diffusion of the UV cure resin 66, rotation of the substrates 61 and 62 is stopped. Then, UV rays 70 are irradiated to a whole of the substrates 61 and 62 by a UV lamp 69 as shown in FIG. 7D so as to cure the UV cure resin 66 wholly, so that bonding of the substrates 61 and 62 is completed and thus, an optical disk 71 is obtained.

In order to detect diffusion of the UV cure resin 66 to the inner periphery of the substrates 61 and 62, a laser beam 67 having a wavelength of, for example, 650 nm is irradiated to an inner peripheral position of the substrates 61 and 62 and a sensor for detecting at least one of reflected light or transmitted light from the substrates 61 and 62 is provided, as will be described later. The sensor detects a change of quantity of the reflected light or quantity of the transmitted light, which change is produced when the UV cure resin 66 has been diffused to the inner periphery of the substrates 61 and 62.

Generally, it is known that in a case where light whose quantity is represented by "K" is incident upon a medium having a refractive index of n2 from a medium having a refractive index of n1, $\{K \times (n2-n1)^2/(n2+n1)^2\}$ is reflected and $[K \times (1-(n2-n1)^2/(n2+n1)^2)]$ is transmitted. If the substrates 61 and 62 have a refractive index of 1.6 and light whose quantity is represented by "L0" is incident on the substrate 62 when the UV cure resin 66 is not filled in an inner peripheral region of the substrates 61 and 62, as shown in FIG. 7B, a quantity of reflected light R1 and a quantity of transmitted light T1 approximately assume (0.18×L0) and (0.82×L0), respectively. On the other hand, if the UV cure resin 66 has a refractive index of 1.6 and the UV cure resin 66 has been filled in the inner peripheral region of the substrates 61 and 62, as shown in FIG. 7C, a quantity of reflected light R2 and a quantity of transmitted light T2 approximately assume (0.10×L0) and (0.90×L0), respectively for the following reason. Namely, since the refractive indexes of the substrates 61 and 62 are equal to that of the UV cure resin 66, reflection at an interface between the substrates 61 and 62 and the UV cure resin 66 is substantially eliminated. Thus, upon filling of the UV cure resin 66 in the inner peripheral region of the substrates 61 and 62, a quantity of reflected light changes from 18% to 10%, while a quantity of transmitted light changes from 82% to 90%. Such a change of quantity of light may be detected by a photodetector.

Figure 8:
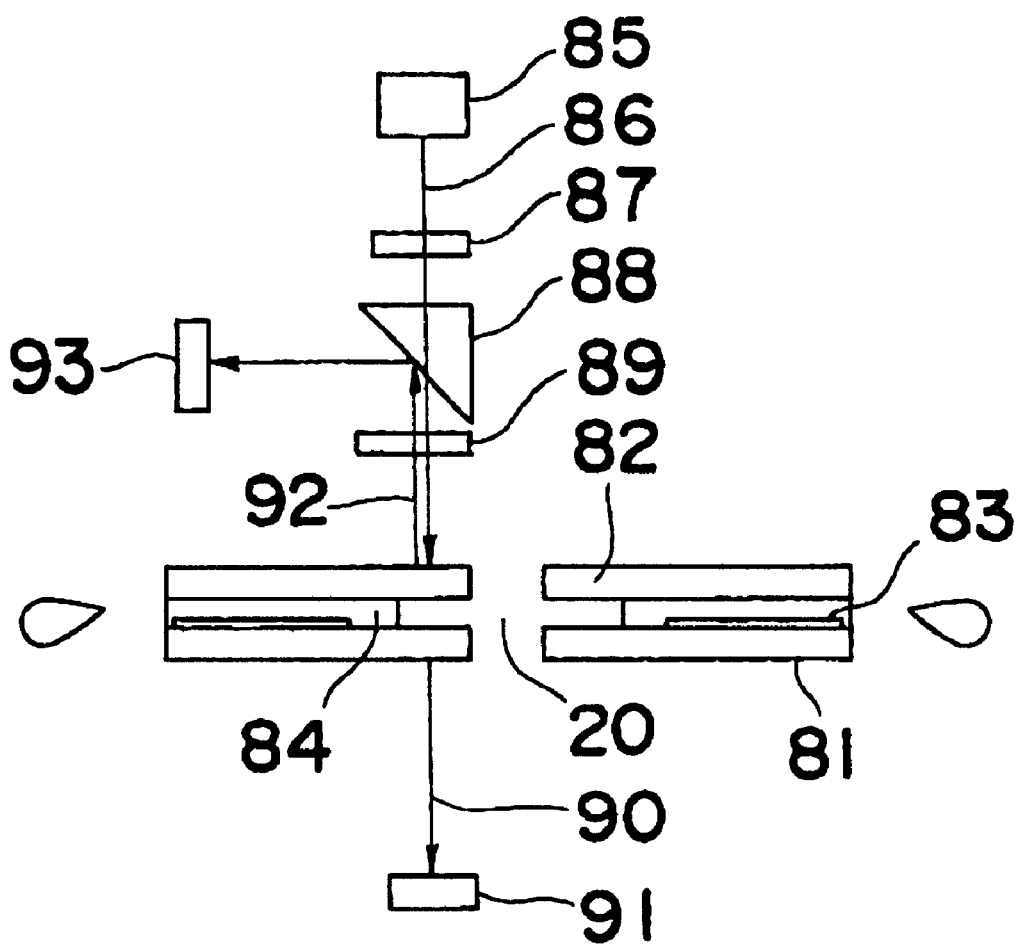
FIG. 8 is a schematic sectional view showing one example of a photodetector employed in the method of FIG. 7.

One example of the photodetector for detecting a change of quantity of reflected light or quantity of transmitted light is shown in FIG. 8, in which a dummy substrate 82 is bonded by UV cure resin 84 to a substrate 81 having a reflective layer 83 formed thereon. A laser beam 86 emitted from a laser diode 85 is turned into collimated rays by a collimator lens 87 and then, is transmitted through a polarization beam splitter (PBS) 88 so as to be incident upon the substrate 82 via a quarter-wave plate 89. The laser beam 86 emitted from the laser diode 85 is linearly polarized light, but is turned into circularly polarized light upon its pass through the quarter-wave plate 89. Reflected light 92 from the substrates 81 and 82 is again transmitted through the quarter-wave plate 89 so as to be turned back into linearly polarized light. However, since direction of polarization of the linearly polarized light 92 is orthogonal to the laser beam 86 during this process, the linearly polarized light 92 is not transmitted through the PBS 88 but is reflected by the PBS 88 so as to be guided to a photodetector 93. The photodetector 93 detects a change of intensity of the reflected light 92, which change is produced when the UV cure resin 84 has been diffused to an inner peripheral region of the substrates 81 and 82.

Meanwhile, if a photodetector 91 is provided on an optical path of transmitted light 90 of the substrates 81 and 82, a change of quantity of the transmitted light 90 can be detected by the photodetector 93. However, in the case where only the transmitted light 90 is detected without detecting the reflected light 92, it is not necessary to provide the PBS 88 and the quarter-wave plate 89.

Figure 9A:
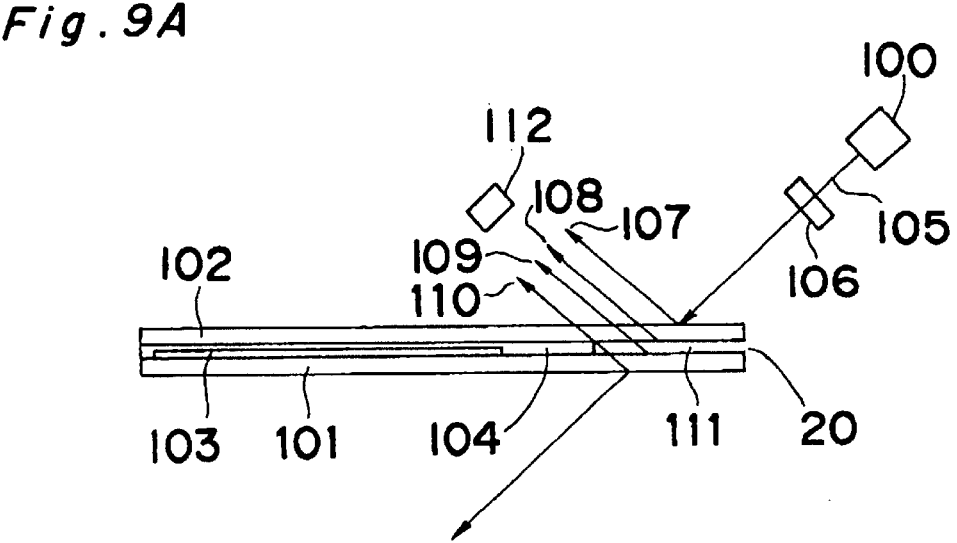
FIGS. 9A and 9B are schematic sectional views showing another example of the photodetector employed in the method of FIG. 7.
Figure 9B:
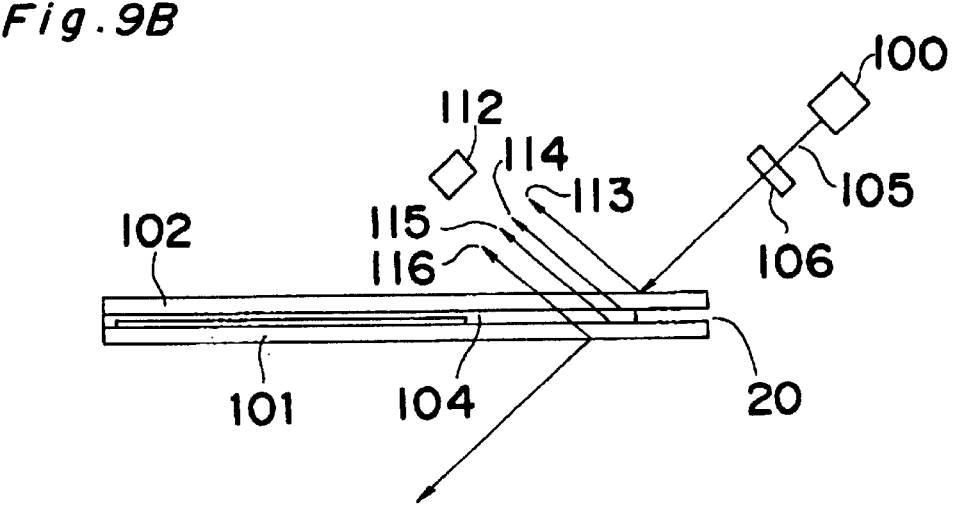

Another example of the photodetector for detecting a change of quantity of reflected light is shown in FIGS. 9A and 9B, in which a dummy substrate 102 is bonded by UV cure resin 104 to a substrate 101 having a reflective layer 103. In the example of FIG. 8, the laser beam 86 for detecting filling of the UV cure resin 84 between the substrates 81 and 82 is perpendicularly incident upon the substrate 82. On the other hand, in FIGS. 9A and 9B, a laser beam 105 is obliquely incident upon the substrate 102. Namely, the laser beam 105 emitted from a laser diode 100 is turned into collimated rays by a collimator lens 106 and then, is obliquely incident upon an innermost peripheral portion of the substrate 102. When the UV cure resin 104 is not diffused to an inner peripheral region of the substrates 101 and 102, as shown in FIG. 9A, the laser beam 105 is sequentially reflected by an upper face of the substrate 102, an interface between a lower face of the substrate 102 and a gap 111 between the substrates 101 and 102, an interface between the gap 111 and an upper face of the substrate 101 and a lower face of the substrate 101 so as to produce reflected light 107, reflected light 108, reflected light 109 and reflected light 110, respectively. At this time, a photodetector 112 is provided on optical paths of the reflected light 108 and the reflected light 109 so as to obtain intensities of the reflected light 108 and the reflected light 109. Supposing that the substrates 101 and 102 have a refractive index of 1.6, a sum of the intensities of the reflected light 108 and the reflected light 109 is about 9%.

It is assumed here that the UV cure resin 104 also has a refractive index of 1.6, identical with that of the substrates 101 and 102. When the UV cure resin 104 has been diffused to a filling completion position in the inner peripheral region of the substrates 101 and 102, as shown in FIG. 9B, the laser beam 105 is sequentially reflected by the upper face of the substrate 102, an interface between the lower face of the substrate 102 and the UV cure resin 104, an interface between the UV cure resin 104 and the upper face of the substrate 101 and the lower face of the substrate 101, so as to produce reflected light 113, reflected light 114, reflected light 115 and reflected light 116, respectively. However, since the refractive index of the substrates 101 and 102 is identical with that of the UV cure resin 104 as described above, reflection of light at the interfaces between the UV cure resin 104 and the substrates 101 and 102 does not occur, so that intensities of the reflected light 114 and the reflected light 115 are substantially 0%. Therefore, it is possible to detect by the photodetector 112 that the UV cure resin 104 has been filled in the inner peripheral region of the substrates 101 and 102. In this method, quantities of reflected light proceeding to the photodetector 112 at the time the UV cure resin 104 is not filled in the inner peripheral region of the substrates 101 and 102 and has been filled in the inner peripheral region of the substrates 101 and 102 are 9% and about 0%, respectively. Accordingly, such an advantage is gained that a large ratio of quantities of reflected light can be obtained.

Meanwhile, in the second embodiment, the UV cure resin 65 is dripped from the nozzle 64 so as to be coated on the substrate 61 annularly and then, the substrate 62 is brought into close contact with the substrate 61, such that not only the central bores 20 of the substrates 61 and 62 are made concentric with each other, but the signal recording faces of the substrates 61 and 62 confront each other. However, in the second embodiment, the modification of FIGS. 3A and 38 in the first embodiment may be employed, in which the dispenser 24 is inserted into the minute gap between the dummy substrate 22 and the substrate 21 having the reflective layer 23, so as to annularly fill the UV cure resin 26 between the substrates 21 and 22, while the substrates 21 and 22 are being rotated at low speed and then, the substrates 21 and 22 are brought into close contact with each other so as to be formed integrally. In the method of FIG. 7, if the substrate 62 is brought into close contact with the substrate 61 rapidly, air bubbles may penetrate in between the substrate 62 and the UV cure resin 66. However, in this modification, since the UV cure resin 25 is filled between the substrates 21 and 22 by the dispenser 24, the penetration of air bubbles in between the substrates 21 and 22 does not take place and thus, such an advantage is achieved that tact time for bonding the substrates 21 and 22 to each other can be shortened.

Meanwhile, in the second embodiment, the refractive index of the substrate is substantially identical with that of the UV cure resin. However, in the second embodiment, the refractive index of the UV cure resin may assume any value other than 1, which is a refractive index of the gap between the substrates.

Figure 10:
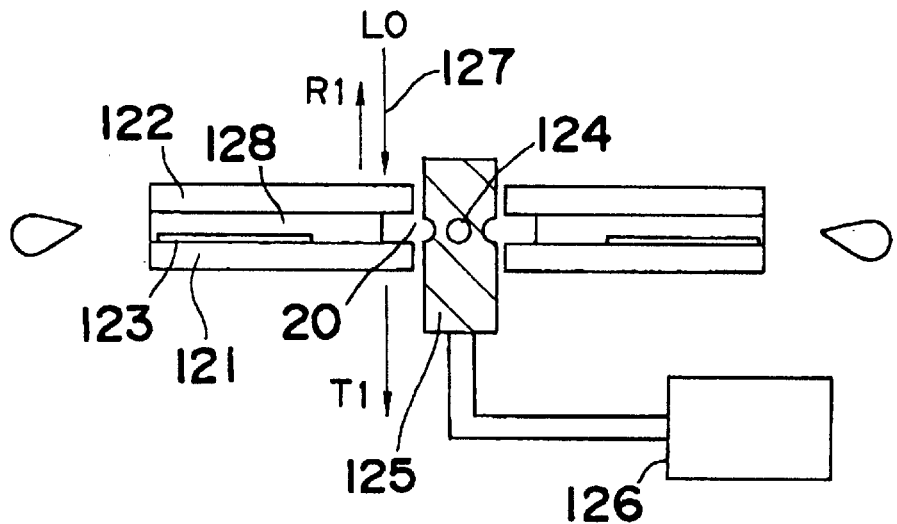
FIG. 10 is sectional view showing a step of a modification of the method of FIG. 7.

A modification of the method of the second embodiment is described with reference to FIG. 10. In this modification, when UV cure resin 128 is diffused between substrates 121 and 122, by rotating the substrates 121 and 122 at high speed after the substrates 121 and 122 have been brought into close contact with each other, the UV cure resin 128 is sucked from the central bores 20 of the substrates 121 and 122. More specifically, after the substrate 121 having a reflective layer 123 and the dummy substrate 122 have been brought into close contact with each other, the substrates 121 and 122 are mounted on a boss 125 having a suction port 124. In this case, the suction port 124 is set so as to be located at a level of a gap between the substrates 121 and 122. The UV cure resin 128 is diffused between the substrates 121 and 122 by rotating the integral substrates 121 and 122 at high speed. At this time, a suction pump 126 is actuated and sucks the UV cure resin 128 from the suction port 124 so as to diffuse the UV cure resin 128 to inner periphery of the substrates 121 and 122. In this case, a laser beam 127 is irradiated to an innermost peripheral portion of the substrate 122. Therefore, by monitoring at least one of reflected light or transmitted light of the laser beam 127 with a photodetector, it is possible to detect that the UV cure resin 128 has been diffused to an innermost peripheral region of the substrates 121 and 122. When the photodetector detects that the UV cure resin 128 has been diffused to the innermost peripheral region of the substrates 121 and 122, suction from the central bores 20 of the substrates 121 and 122 by the suction pump 126 and rotation of the substrates 121 and 122 are stopped and then, the step of irradiating UV rays to a whole of the substrate 122 is performed in the same manner as in FIG. 7D.

Figure 11:
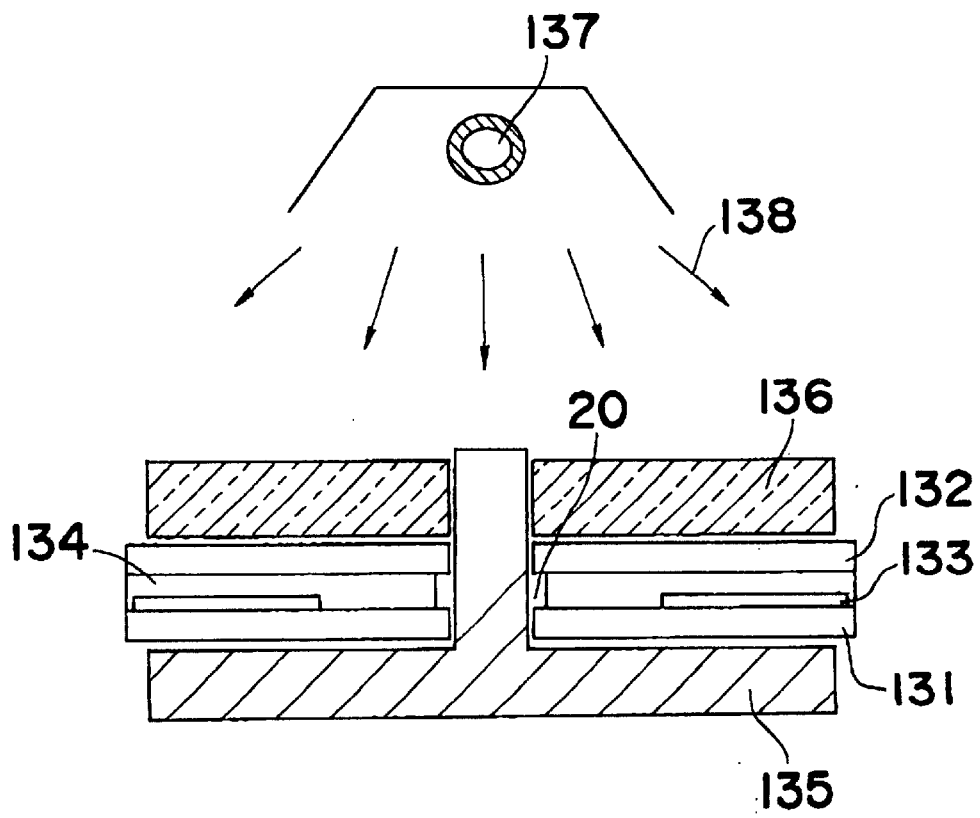
FIG. 11 is a sectional view showing a step of another modification of the method of FIG. 7.

Another modification of the method of the second embodiment is described with reference to FIG. 11. In this modification, when UV rays 138 are irradiated to a whole of a substrate 132, so as to wholly cure UV cure resin 134 after the UV cure resin 134 has been fully diffused between substrates 131 and 132, the integral substrates 131 and 132 are gripped between two flat plates, e.g. a substrate holder 135 and a transparent disk-like glass plate 136 so as to be subjected to a load. More specifically, the UV cure resin 134 is already filled between the substrate 131 having a reflective layer 133 and the dummy substrate 132. In the method of the present invention, since diffusion of the UV cure resin 134 is detected, diffusion of the UV cure resin 134 is stopped at a predetermined position in an innermost peripheral region of the substrates 131 and 132. In this state, the substrates 131 and 132 are placed on the substrate holder 135 and then, the glass plate 136 is placed on the substrates 131 and 132 so as to apply the load to the substrates 131 and 132 such that tilt of the substrates 131 and 132 is reduced for correction. Since UV rays are transmitted through the glass plate 136, the UV rays 138 are irradiated to the whole of the substrate 132 from above the glass plate 136 by a UV lamp 137 so as to wholly cure the UV cure resin 134. A tilt of a thus obtained optical disk is made smaller than that in the case where a load is not applied to the substrates 131 and 132. This effect of reducing tilt of the optical disk becomes greater as the substrates 131 and 132 become thinner.

Meanwhile, in the above mentioned first and second embodiments, a read-only optical disk in which only the reflective layer is provided on the substrate has been described. However, it is needless to say that the present invention can be also applied to a write-once read multiple optical disk and a rewritable optical disk.

Furthermore, in the first and second embodiments, a case in which the reflective layer is provided on only one of the substrates and the other substrate is the dummy substrate has been adopted. However, if the substrate having the reflective layer transmits UV rays therethrough, the reflective layer may be provided on each of the substrates. The inventors of the present invention have confirmed that even if transmittance of a substrate having a reflective layer is about 1%, the substrate is capable of curing the UV cure resin sufficiently and therefore, can be used in the present invention. Meanwhile, in a case where the reflective layer is provided on each of the substrates and both of the substrates are capable of transmitting UV rays therethrough, UV rays may be irradiated from both of the substrates, concurrently. A thin film may generate heat upon absorption of UV rays and one side of the UV cure resin, upon which UV rays are incident, is readily cured. Therefore, if UV rays are irradiated from both of the substrates as described above, a more symmetric optical disk having less tilt can be obtained. Meanwhile, in a case where UV rays are irradiated while a load is being applied to the substrates, as shown in FIGS. 6 and 11, the UV rays can be irradiated from both of the substrates, concurrently, if the substrate holders 56 and 135 are also made of translucent material such as glass.

Meanwhile, in the first and second embodiments, since the substrate and the dummy substrate are identical with each other, signals are also recorded on the dummy substrate. However, it is needless to say that the signals are not required to be recorded on the dummy substrate. Furthermore, a thickness of the dummy substrate may be different from that of the substrate. Especially, in a case where the dummy substrate has a thickness of not more than 0.2 mm, for example, the dummy substrate has a thickness of about 0.1 mm, a rigidity of the dummy substrate is small. Therefore, it is difficult to form a stopper on the dummy substrate for preventing the radiation cure resin from advancing into the inner peripheral region of the substrates and it is also difficult to perform work for forming grooves, etc. on the dummy substrate itself. In such a case, the method of the present invention in which the radiation cure resin is cured in the inner peripheral region of the substrates is especially effective for preventing the radiation cure resin from advancing into the inner peripheral region of the substrates.

Moreover, even if the reflective layer is provided on each of the substrates and neither of the substrates transmits UV rays therethrough, the present invention can be utilized as follows in a case where a transparent region free from the reflective layer exists in an innermost peripheral region or an outermost peripheral region of the substrates. Namely, by using an adhesive resin having both a thermosetting property and UV curing property, etc., UV rays are irradiated from one or both of the substrates, concurrently, so as to cure the transparent region and then, the transparent region is thermoset.

As is clear from the foregoing description of the first and second embodiments of the present invention in bonding of the substrates of the optical disk by the radiation cure resin, the filling of the resin at the inner most periphery of the substrates can be controlled to an arbitrary position regardless of whether or not a stopper for preventing the resin from protruding into the central bores of the substrates is provided at the innermost periphery of the substrates or regardless of position of the stopper. Consequently, an optical disk having a high mechanical strength and a good external appearance, in which the filling position of the resin at the innermost periphery of the substrates is fixed, can be manufactured at high yield and at low cost.

Third Embodiment

Hereinafter, third to fifth embodiments of the present invention, in which thickness of the UV cure resin is made uniform such that recording and playback characteristics do not vary even when recording or playback of signals is performed through the UV cure resin, are described.

Figure 12A:
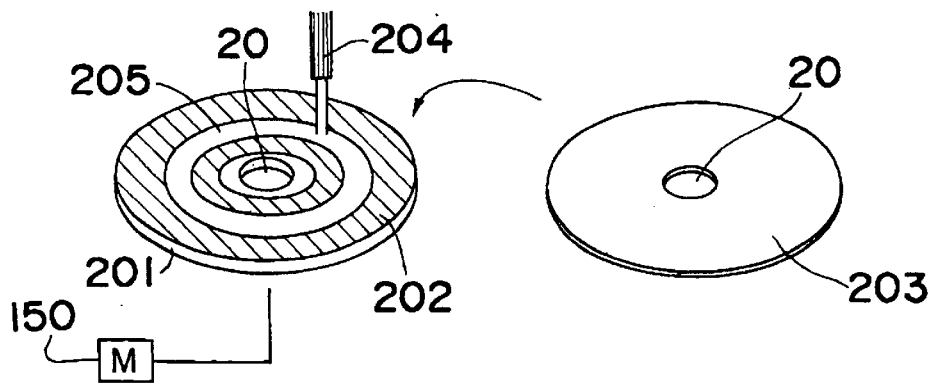
FIGS. 12A, 12B and 12C are perspective views showing steps of a method of manufacturing an optical information recording medium, according to a third embodiment of the present invention.

A method of manufacturing an optical disk, according to the third embodiment of the present invention is described with reference to FIGS. 12A–13. In FIG. 12A, a first substrate 201 is a polycarbonate substrate produced by injection molding and having a thickness of 1.1 mm and a diameter of 120 mm. The central bore 20 of the first substrate 201 has a diameter of 15 mm. A signal recording layer 202 is provided on one principal face of the first substrate 201. In the signal recording layer 202, information signals are preliminarily recorded as pits and a reflective layer made of aluminum and having a thickness of about 100 nm is further provided on the pits. Meanwhile, a second substrate 203 is a sheetlike polycarbonate substrate having a thickness of 90 $\mu$m and a diameter of 120 mm. The central bore 20 of the second substrate 203 has a diameter of 15 mm. Since a signal recording layer is not provided on the second substrate 203, the second substrate 203 is flat.

Initially, UV cure resin 205 is dripped from a nozzle 204 so as to be coated on the signal recording layer 202 of the first substrate 201 annularly by rotating the first substrate 201 at low speed, for example, at 20 to 120 rpm with the motor 150. Alternatively, the nozzle 204 may also be rotated and the first substrate 201 fixed. Then, the second substrate 203 is brought into close contact with the first substrate 201 such that the central bores 20 of the first and second substrates 201 and 203 confront each other concentrically.

Thereafter, owing to a weight of the second substrate 203 and capillarity, UV cure resin 211 is diffused between the first and second substrates 201 and 203. At this time, if the substrates 201 and 203 are rotated at high speed, for example, at 300 to 6000 rpm by the motor 150, diffusion of the UV cure resin 211 to an outer periphery of the substrates 201 and 203 is accelerated and thus, tact time can be reduced greatly. An excessive portion of the UV cure resin 211 is expelled as droplets 209 from the outermost periphery of the substrates 201 and 203 by centrifugal force of the high-speed rotation of the substrates 201 and 203, as shown in FIGS. 12B and 13.

In a conventional method, the rotation of the substrates is stopped at the time a thickness of the UV cure resin has become substantially uniform upon diffusion of the UV cure resin from the inner periphery to the outer periphery of the substrates. Then, UV rays are irradiated to a whole of the substrates, so as to cure the UV cure resin and thus, bonding of the substrates is completed. However, in this known method, since the UV cure resin is diffused by centrifugal force of high-speed rotation of the substrates, the UV cure resin becomes thin at inner periphery of the substrates and thick at outer periphery of the substrates. The effect of such thickness distribution of the UV cure resin becomes greater in a case where a laser beam spot is reduced in diameter. Namely, in a case where a bluish purple laser beam is employed as a laser beam or an objective lens having an NA as large as 0.85 is employed. For example, supposing that playback of signals is performed from the second substrate 203 via the UV cure resin 211 by using a bluish purple laser beam having a wavelength of 400 nm and an objective lens having an NA of 0.85 in the third embodiment, a sum of a thickness of the second substrate 203 and a thickness of the UV cure resin 211 is required to fall within a range of about ±3 $\mu$m from its nominal value of, for example, 100 $\mu$m, i.e. 0.1 mm. However, in the known method, since the thickness of the UV cure resin at the outer periphery of the substrates is larger than that at the inner periphery of the substrates, it is difficult to set the sum of the thickness of the second substrate 203 and the thickness of the UV cure resin 211 within the range of +3 $\mu$m from the nominal value.

Figure 12B:
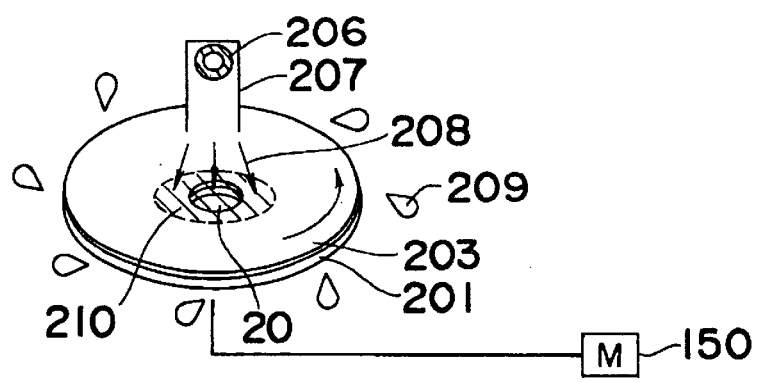
Figure 12C:
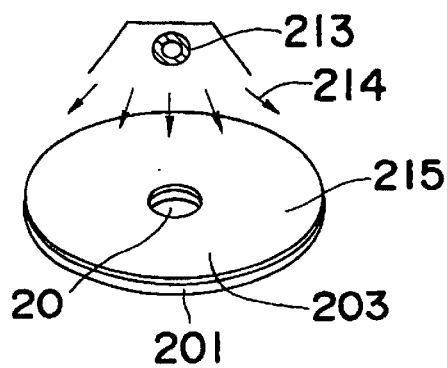
Figure 13:
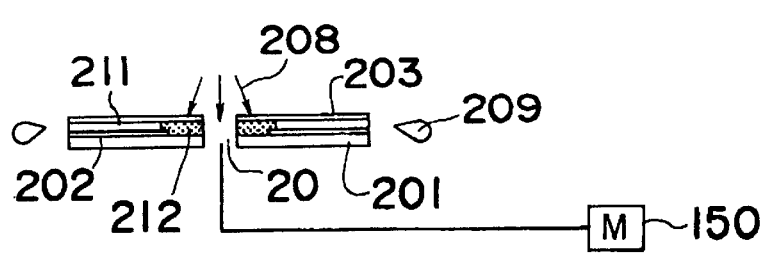
FIG. 13 is a sectional view of FIG. 12B.

Therefore, in the third embodiment, when the UV cure resin 211 has been spread to the inner periphery of the substrates 201 and 203, UV rays 208 are irradiated by a UV lamp 206 to only an inner peripheral region of the substrates 201 and 203, i.e. a UV irradiation region 210, as shown in FIG. 12B, so as to preliminarily cure the UV cure resin 211 at the inner peripheral region of the substrates 201 and 203 only. The UV lamp 206 is covered by a UV shielding cover 207. By irradiating the UV rays 208 to the inner peripheral region of the substrates 201 and 203, a: cure region 212 in which the UV cure resin 211 is cured is formed, as shown in FIG. 13. Rotation of the substrates 201 and 203 is further continued for a predetermined period. The UV cure resin 211 at the inner peripheral region of the substrates 201 and 203 is already cured and therefore, does not further thin. However, the UV cure resin 211 from an intermediate peripheral region to an outer peripheral region of the substrates 201 and 203 is not yet cured and becomes thinner upon rotation of the substrates 201 and 203. By rotating the substrates 201 and 203 for the predetermined period, the thickness of the UV cure resin 211 at the outer peripheral region of the substrates 201 and 203 can be made identical with that at the inner peripheral region of the substrates 201 and 203. At this stage, the rotation of the substrates 201 and 203 is stopped and UV rays 214 are irradiated to a whole of the substrate 203 by a UV lamp 213, as shown in FIG. 12C. As a result, the bonding of the substrates 201 and 203 is completed such that thickness of the UV cure resin 211 is uniform from inner periphery to outer periphery of the substrates 201 and 203 and thus, an optical disk 215 is obtained.

In the third embodiment, after the substrates 201 and 203 have been brought into close contact with each other, the substrates 201 and 203 are rotated at 4000 rpm for two seconds. Then, the UV rays 208 are irradiated to the inner peripheral region of the substrates 201 and 203. Furthermore, after the rotation of the substrates 201 and 203 has been continued for two seconds, the rotation of the substrates 201 and 203 is stopped and the UV rays 214 are irradiated to the whole of the substrate 203. At this time, the sum of the thickness of the second substrate 203 and the thickness of the UV cure resin 211 assumes 100 $\mu$m, 101 $\mu$m and 102 $\mu$m at the inner peripheral region, the intermediate peripheral region and the outer peripheral region of the substrates 201 and 203, respectively. Thereby, a excellent distribution of the sum of the thickness of the second substrate 203 and thickness of the UV cure resin 211 results.

Meanwhile, as comparative examples, a prior art method has been performed in which the UV cure resin 211 at the inner periphery of the substrates 201 and 203 is not preliminarily cured. As a first comparative example, after the substrates 201 and 203 have been rotated at 4000 rpm for two seconds, the rotation of the substrates 201 and 203 is stopped and then, the UV rays 214 are irradiated to the whole of the substrate 203 so as to cure the UV cure resin 211. In a thus obtained optical disk, a sum of the thickness of the second substrate 203 and the thickness of the UV cure resin 211 assumes 100 $\mu$m, 105 $\mu$m and 115 $\mu$m at the inner peripheral region, the intermediate peripheral region and the outer peripheral region of the substrates 201 and 203, respectively. Meanwhile, as a second comparative example, in a case where the rotation of the substrates 201 and 203 is stopped after the substrates 201 and 203 have been rotated at 4000 rpm for four seconds, a sum of the thickness of the second substrate 203 and the thickness of the UV cure resin 211 assumes 90 $\mu$m, 100 $\mu$m and 103 $\mu$m at the inner peripheral region, the intermediate peripheral region and the outer peripheral region of the substrates 201 and 203, respectively. In both of the comparative examples, the sum of the thickness of the second substrate 203 and the thickness of the UV cure resin 211 varies greatly in an optical disk.

Meanwhile, in the third embodiment, the signal recording layer 202 is provided only on the first substrate 201. However, the present invention can also be applied to manufacture an optical disk of a type in which a translucent signal recording layer is provided on the second substrate 203 and playback of signals of both of the signal recording layers is performed from the second substrate 203. This is because playback of signals of the signal recording layer 202 of the first substrate 201 from the second substrate 203 should be performed through the UV cure resin 211.

Furthermore, in the third embodiment, a read-only optical disk in which, in the signal recording layer, information signals are recorded as pits and the reflective layer of aluminum is provided on the pits has been described. However, it is needless to say that the present invention can also be applied to a recordable optical disk in which recording and playback of signals can be performed after completion of manufacture of the optical disk.

Meanwhile, in the third embodiment, the UV rays 214 are irradiated to the whole of the substrate 203 after a stop of rotation of the substrates 201 and 203. However, the UV rays 214 may also be irradiated to the whole of the substrate 203 while the substrates 201 and 203 are being rotated.

Fourth Embodiment

Figure 14:
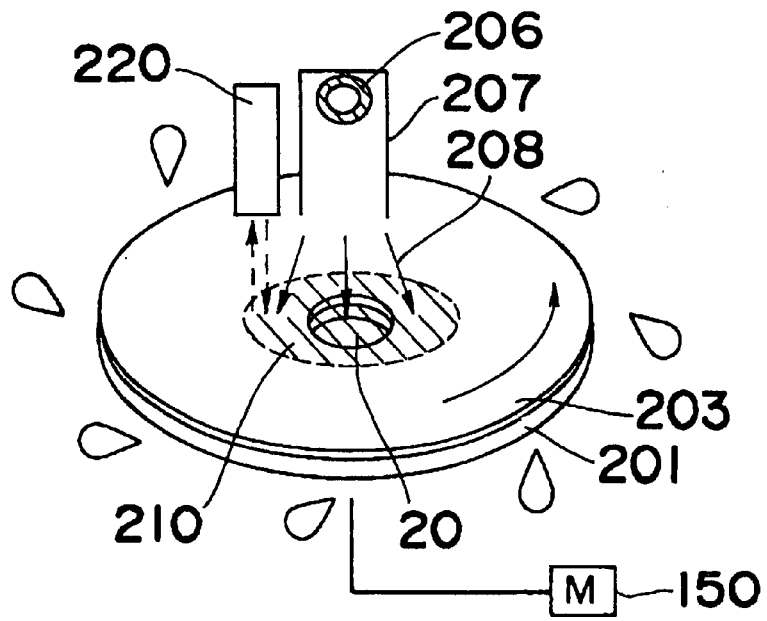
FIG. 14 is a perspective view showing a step of a method of manufacturing an optical information recording medium, according to fourth embodiment of the present invention.

A method of manufacturing an optical disk, according to the fourth embodiment of the present invention is described with reference to FIG. 14. In bonding of substrates of the optical disk, the thickness of UV cure resin is almost completely determined by the number and period of rotations of the substrates, which rotations of the substrates are performed after the substrates have been brought into close contact with each other. However, the thickness of the UV cure resin may scatter with a change of viscosity of the resin, due to temperature changes and an amount of warpage between prior to and after bonding of the substrates. A method of the present invention is described in which even in such a case, a scatter of thickness of the UV cure resin is restrained, so as to obtain an accurate thickness of the UV cure resin.

A step of initially dripping UV cure resin on the first substrate 201 from the nozzle and a step of bringing the second substrate 203 into close contact with the first substrate 201 are performed in the same manner as those of the third embodiment. After the substrates 201 and 203 have been brought into close contact with each other, the substrates 201 and 203 are rotated at high speed by the motor 150 so as to spread the UV cure resin 211. At this time, a thickness of the UV cure resin 211 at an inner peripheral region of the substrates 201 and 203 is measured by a film thickness meter 220, as shown in FIG. 14. The film thickness meter 220 is of reflection type and is capable of measuring a distance from the signal recording layer 202 to an upper face of the second substrate 203, i.e. a sum of thickness of the UV cure resin 211 and thickness of the second substrate 203. When the substrates 201 and 203 are rotated at high speed, the thickness of the UV cure resin 211 at the inner peripheral region of the substrates 201 and 203 decreases gradually. However, in the fourth embodiment, irradiation of the UV rays 208 to the inner peripheral region of the substrates 201 and 203 is adapted to be started at the time the film thickness meter 220 indicates that the sum of the thickness of the UV cure resin 211 and the thickness of the second substrate 203 has reached a preset value. As a result, even if there are variations of viscosity of the UV cure resin 211, etc. thickness of the UV cure resin 211 at the inner peripheral region of the substrates 201 and 203 can be kept constant at all times.

Subsequently, in the same manner as the third embodiment, after rotation of the substrates 201 and 203 has been continued for a predetermined period such that thickness of the UV cure resin 211 at the inner peripheral region of the substrates 201 and 203 is made identical with that at the outer peripheral region of the substrates 201 and 203, rotation of the substrates 201 and 203 is stopped and then, the UV rays 214 are irradiated to the whole of the substrate 203 by the UV lamp 213. Consequently, bonding of the substrates 201 and 203 is completed such that the thickness of the UV cure resin 211 is uniform from inner periphery to outer periphery of the substrates 201 and 203 and thus, an optical disk is obtained.

Meanwhile, in the fourth embodiment, the signal recording layer 202 is provided only on the first substrate 201. However, the present invention can also be applied to manufacture an optical disk of a type in which a translucent signal recording layer is provided on the second substrate 203 and playback of signals of both of the signal recording layers is performed from the second substrate 203. In this case, when the film thickness meter 220 for detecting thickness of the UV cure resin 211 indicates that thickness of the UV cure resin 211 has reached a predetermined value, irradiation of the UV rays 208 to the inner peripheral region of the substrates 201 and 203 is started.

Meanwhile, in the fourth embodiment, the film thickness meter 220 is provided only at the inner peripheral region of the substrates 201 and 203. A modification of the method of the fourth embodiment is described with reference to FIG. 15. In this modification, a film thickness meter 221 is provided also at the outer peripheral region of the substrates 201 and 203 in addition to the film thickness meter 220. In a case where the substrates 201 and 203 are rotated at high speed by the motor 150, so as to spread the UV cure resin 211 after the substrates 201 and 203 have been brought into close contact with each other, irradiation of the UV rays 208 to the inner peripheral region of the substrates 201 and 203 is started upon detection by the film thickness meter 220 that the sum of the thickness of the UV cure resin 211 and the thickness of the second substrate 203 at the inner peripheral region of the substrates 201 and 203 has reached the preset value. Thereafter, the rotation of the substrates 201 and 203 is continued while a sum of the thickness of the UV cure resin 211 and the thickness of the second substrate 203 at the outer peripheral region of the substrates 201 and 203 is being measured by the film thickness meter 221. When the film thickness meter 221 indicates that the sum of the thickness of the UV cure resin 211 and the thickness of the second substrate 203 at the outer peripheral region of the substrates 201 and 203 has reached the preset value, rotation of the substrates 201 and 203 is stopped. Then, in the same manner as the fourth embodiment, the UV rays 214 are irradiated to the whole of the substrate 203 by the UV lamp 213. As a result, bonding of the substrates 201 and 203 is completed such that thickness of the UV cure resin 211 is completely uniform from inner periphery to outer periphery of the substrates 201 and 203.

Figure 15:
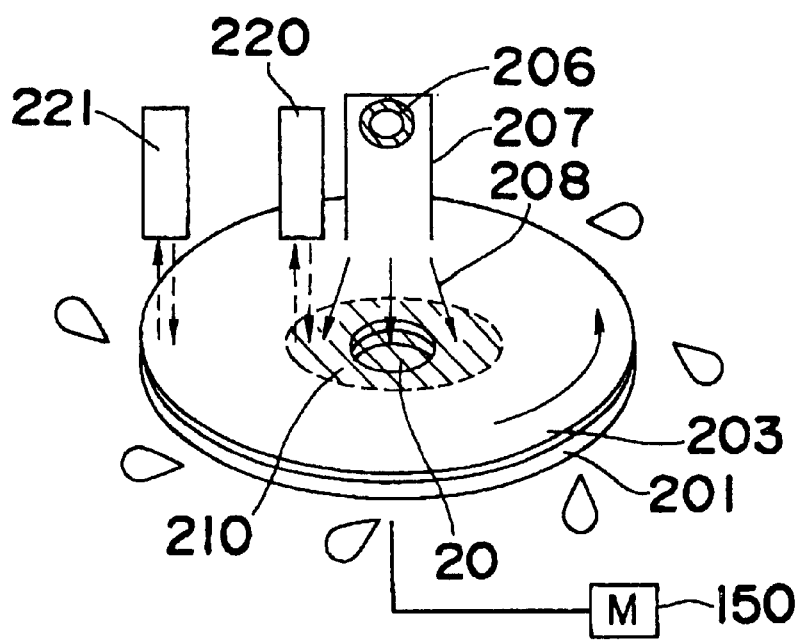
FIG. 15 is a view similar to FIG. 14, particularly showing a modification thereof.

Meanwhile, in the modification of FIG. 15, the film thickness meters 220 and 221 are, respectively, provided at the inner peripheral region and the outer peripheral region of the substrates 201 and 203, but may also be provided at other radial positions. Furthermore, not less than three film thickness meters may be provided.

In addition, a plurality of film thickness meters may be provided at an inner peripheral radial position and other radial positions such that UV rays are irradiated to only neighborhood of the respective radial positions when readings of the film thickness meters have reached a preset value.

Fifth Embodiment

Figure 16:
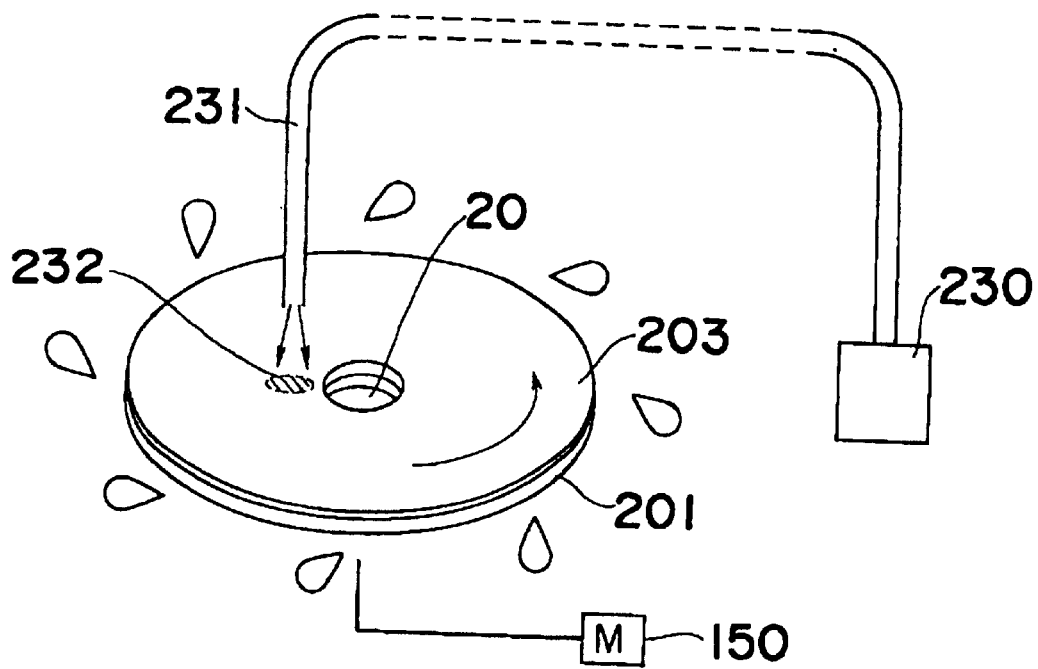
FIG. 16 is a perspective view showing a step of a method of manufacturing an optical information recording medium, according to a fifth embodiment of the present invention.

A method of manufacturing an optical disk, according to the fifth embodiment of the present invention is described with reference to FIG. 16. In the third and fourth embodiments, the UV lamp 206 is used as a UV irradiation device and is covered by the UV shielding cover 207, so as to irradiate the UV rays 208 to the inner peripheral region of the substrates 201 and 203 concentrically with the central bores 20 of the substrates 201 and 203. In the fifth embodiment, the UV irradiation device for irradiating the UV rays to the inner peripheral region of the substrates 201 and 203 is constituted by a UV light source 230 and an optical fiber 231.

In the same manner as the third embodiment, the UV cure resin 205 is initially dripped on the first substrate 201 from the nozzle 204 and then, the second substrate 203 is brought into close contact with the first substrate 201. Subsequently, the substrates 201 and 203 held in close contact with each other are rotated at a high speed by the motor 150, so as to spread the UV cure resin 211. After a predetermined period, a UV spot light 232 is irradiated from the optical fiber 231 to the inner peripheral region of the substrates 201 and 203. The UV spot light 232 is produced by the UV light source 230 provided at a location other than immediately above the second substrate 203. Since the substrates 201 and 203 are rotated at the high speed, an annular cured region in which the UV cure resin 211 is cured is formed at an inner periphery of the substrates 201 and 203 concentrically with the central bores 20.

Then, in the same manner as the third embodiment, after the thickness of the UV cure resin 211 at the inner peripheral region of the substrates 201 and 203 has been made identical with that at the outer peripheral region of the substrates 201 and 203 by continuing rotation of the substrates 201 and 203 for a predetermined period, rotation of the substrates 201 and 203 is stopped and the UV rays 214 are irradiated to the whole of the substrate 203 by the UV lamp 213. As a result, bonding of the substrates 201 and 203 is completed such that thickness of the UV cure resin 211 is uniform from inner periphery to outer periphery of the substrates 201 and 203, so that an optical disk is obtained.

By curing the UV cure resin 211 at the inner peripheral region of the substrates 201 and 203 by the UV spot light 232, such advantages are gained that the UV light source 230 can be spaced away from a location for coating the UV cure resin 205, a location for bringing the substrates 201 and 203 into close contact with each other, and a location for rotating the substrates 201 and 203. There is no risk of cure of the UV cure resin due to leakage of the UV rays, thus resulting in facilitation of a layout of parts of an apparatus for manufacturing the optical disk.

It is needless to say that the film thickness meter of the fourth embodiment may be added in the fifth embodiment.

Figure 17:
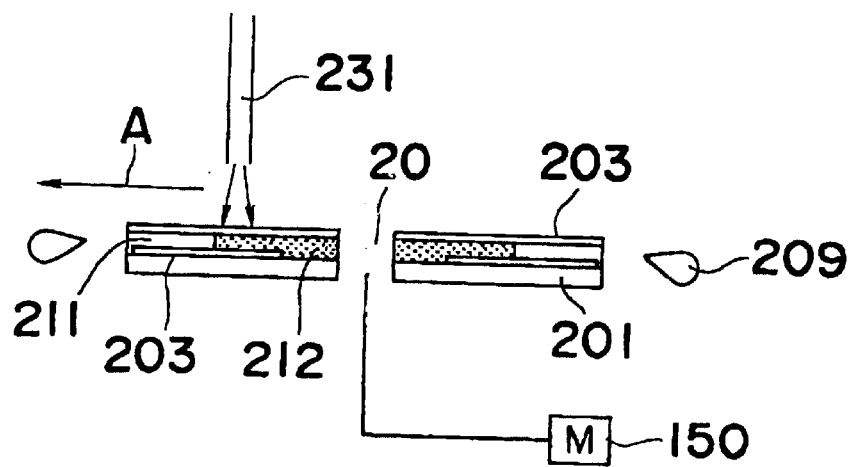
FIG. 17 is a sectional view showing a step of a modification of the method of FIG. 16.

A modification of the method of the fifth embodiment is described with reference to FIG. 17. In this modification, after the UV spot light 232 has been irradiated to the inner peripheral region of the substrates 201 and 203 from the optical fiber 231 in the same manner as the fifth embodiment, the UV spot light 232 is gradually displaced to outer periphery of the substrates 201 and 203 in the direction shown by the arrow A and thus, the UV cure resin 211 can be cured wholly from the inner periphery to the outer periphery of the substrates 201 and 203. At an initial stage of processing, thickness of the UV cure resin 211 is small at inner periphery of the substrates 201 and 203 but large at outer periphery of the substrates 201 and 203. Therefore, if the UV spot light 232 is displaced to outer periphery of the substrates 201 and 203 with lapse of time, thickness of the UV cure resin 211 can be made uniform from the inner periphery to the outer periphery of the substrates 201 and 203. In this modification, the UV lamp 213 for irradiating the UV rays 214 to the whole of the substrate 203 in the third embodiment can be eliminated and thus, the apparatus for manufacturing the optical disk can be advantageously structurally simplified.

In the third to fifth embodiments, the first substrate 201 has a thickness of 1.1 mm and the second substrate 203 has a thickness of 0.09 mm. However, thickness of the first substrate 201 and that of the second substrate 203 in the third to fifth embodiments are not restricted to the above mentioned values. However, for the following reason, the third to fifth embodiments are quite effective especially when thickness of the second substrate 203 is not more than 0.2 mm. Namely, when thickness of the second substrate 203 is larger than 0.2 mm, the rigidity of the second substrate 203 is large, so that thickness of the UV cure resin 211 depends considerably on the parallelism of the substrates 201 and 203. However, when thickness of the second substrate 203 is not more than 0.2 mm, the rigidity of the second substrate 203 is small, so that thickness of the UV cure resin 211 is readily determined by the flow of the UV cure resin 211 at the time of high-speed rotation of the substrates 201 and 203. Thus, the trend is that the UV cure resin 211 is thin at the inner periphery of the substrates 201 and 203, but thick at the outer periphery of the substrates 201 and 203 which becomes dominant. Accordingly, the third to fifth embodiments are quite advantageous in that thickness of the UV cure resin 211 can be made uniform from the inner periphery to the outer periphery of the substrates 201 and 203, even when the thickness of the second substrate 203 is not more than 0.2 mm.

Meanwhile, in the third to fourth embodiments, after the UV cure resin 205 has been annularly dripped from the nozzle 204 on the first substrate 201, the second substrate 203 is placed on the first substrate 201 so as to be brought into close contact with the first substrate 201. However, in the third to fifth embodiments, the arrangement of FIG. 3 may also be employed in which the first and second substrates 201 and 203 are held in parallel with each other by preliminarily forming a gap of severalmm in width therebetween. The needlelike dispenser 24 is then inserted into the gap between the first and second substrates 201 and 203 so as to discharge and fill the UV cure resin between the first and second substrates 201 and 203, while the first and second substrates 201 and 203 are being rotated at a low speed.

Figure 4:
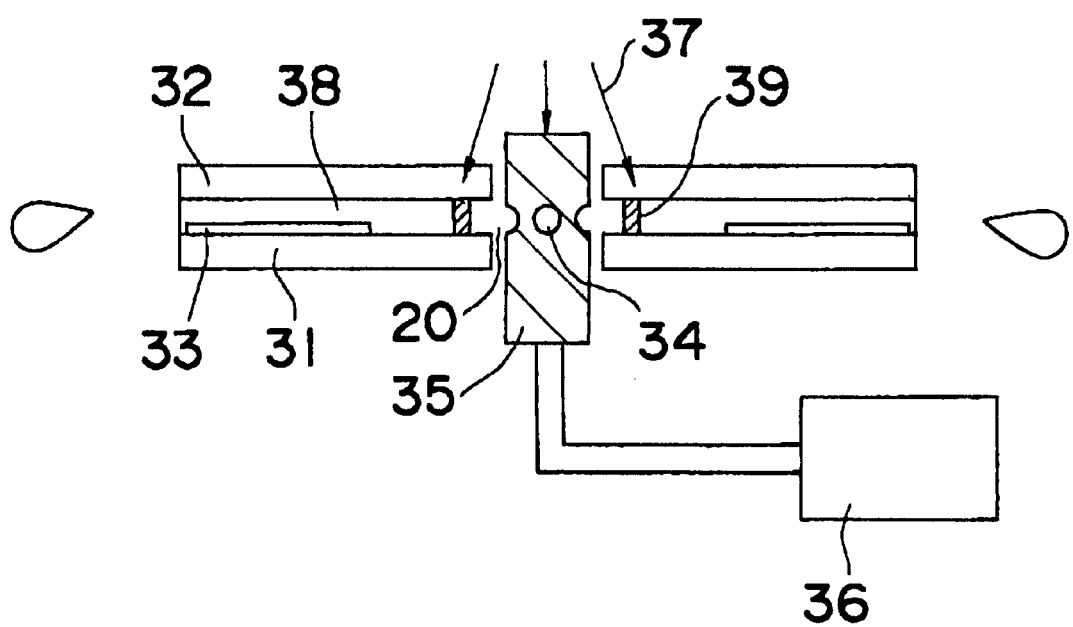
FIG. 4 is a sectional view showing a step of another modification of the method of FIG. 1.

Moreover, in the third to fifth embodiments, the arrangement of FIG. 4 may also be employed in which when the UV cure resin is spread by rotating the substrates 201 and 203 at a high speed after the substrates 201 and 203 have been brought into close contact with each other by the UV cure resin. The UV cure resin between the substrates 201 and 203 is sucked from the central bores 20 of the substrates 201 and 203 by the suction pump 36 such that diffusion of the UV cure resin to inner periphery of the substrates 201 and 203 is accelerated.

In the first, third, fourth and fifth embodiments, when radiation is irradiated to the neighborhood of the central bores so as to preliminarily cure the radiation cure resin in the neighborhood of the central bores after the first and second substrates have been formed integrally, the radiation is preferably irradiated radially inwardly of a signal recording region of the optical disk for the following reason. Namely, when radiation is subsequently irradiated to the whole of the outer face of one of the first and second substrates so as to wholly cure the radiation cure resin, the signal recording region is cured uniformly and concurrently, so that variations of signal recording and playback characteristics due to nonuniform curing of the signal recording region can be minimized.

As was be seen from the foregoing description of the third to fifth embodiments of the present invention, the thickness of the UV cure resin for bonding the substrates to each other can be made uniform from the inner periphery to the outer periphery of the substrates. Therefore, in an optical disk of a type in which recording or playback is performed through the UV cure resin, recording and playback characteristics can be made uniform from the inner periphery to the outer periphery of the substrates. Consequently, the optical disk can be manufactured at high yield and at low cost.

What is claimed is:

1. A method of manufacturing an optical information recording medium, in which a first substrate having a first central bore and a second substrate having a second central bore are bonded to each other with radiation cure resin, said method comprising:

coating the radiation cure resin on the first substrate;

bringing the first and second substrates into close contact with each other with the radiation cure resin in between so as to form the first and second substrates integrally;

rotating the first and second substrates;

measuring a thickness of the radiation cure resin at an inner region of the first substrate and the second substrate extending radially from a center of the first and second central bores;

when the thickness of the radiation cure resin at the inner region reaches a preset value, irradiating the inner region of the first substrate and the second substrate to concurrently cure only a portion of the radiation cure resin at the inner region; and irradiating at least one of opposite outer faces of the integral first and second substrates, after said irradiation of the inner region, so as to cure a remainder of the radiation cure resin.

2. A method as claimed in claim 1, wherein said bringing of the first and second substrates into close contact includes rotating the first and second substrates so as to diffuse the radiation cure resin uniformly.

3. A method as claimed in claim 1, wherein said bringing of the first and second substrates into close contact includes sucking the radiation cure resin from the first and second central bores of the integral first and second substrates.

4. A method as claimed in claim 1, wherein said irradiating of the inner region is performed by a spot light.

5. A method as claimed in claim 1, wherein at least one of two flat plates transmits the radiation therethrough and said irradiating so as to cure the remainder of the radiation cure resin of the at least one of the opposite outer faces of the integral first and second substrates includes gripping the first and second substrates between the two flat plates and irradiating from the at least one of the flat plates.

6. A method as claimed in claim 1, wherein said irradiating of the inner region occurs radially inward of a signal recording region of the optical information recording medium.

7. A method as claimed in claim 1, wherein at least one of the first and second substrates has a thickness of not more than 0.2 mm.

8. A method as claimed in claim 7, wherein the thickness is about 0.1 mm.

9. A method according to claim 1, wherein said rotating of the first and second substrates is in a range of 300 to 6,000 rpm.

10. A method as claimed in claim 1, further comprising:

measuring a thickness of the radiation cure resin at an outer peripheral region of the first substrate and the second substrate, wherein when the thickness of the radiation cure resin at the outer peripheral region reaches a preset value, said irradiating of the at least one of opposite outer faces of the integral first and second substrates operation is performed.

11. A method of manufacturing an optical information recording medium, in which a first substrate having a central bore and a second substrate having a second central bore are bonded to each other with radiation cure resin, said method comprising:

causing the first and second substrates to confront each other by forming a minute gap between the first and second substrates;

inserting a dispenser into the gap so as to fill the radiation cure resin between the first and second substrates;

bringing the first and second substrates into close contact with each other with the radiation cure resin in between so as to form the first and second substrates integrally;

rotating the first and second substrates;

measuring a thickness of the radiation cure resin at an inner region of the first substrate and the second substrate extending radially from a center of the first and second central bores;

when the thickness of the radiation cure resin at the inner region reaches a preset value, irradiating the inner region of the first substrate and the second substrate to concurrently cure only a portion of the radiation cure resin at the inner region; and irradiating at least one of opposite outer faces of the integral first and second substrates, after said irradiating of the inner region, so as to cure a remainder of the radiation cure resin.

12. A method as claimed in claim 11, wherein said bringing of the first and second substrates into close contact includes rotating the first and second substrates so as to diffuse the radiation cure resin uniformly.

13. A method as claimed in claim 11, wherein said bringing of the first and second substrates into close contact includes sucking the radiation cure resin from the first and second central bores of the integral first and second substrates.

14. A method as claimed in claim 11, wherein said irradiating of the inner region is performed by a spot light.

15. A method as claimed in claim 11, wherein at least one of two flat plates transmits the radiation therethrough and said irradiating so as to cure the remainder of the radiation cure resin of the at least one of the opposite outer faces of the integral first and second substrates includes gripping the first and second substrates between the two flat plates and irradiating from the at least one of the flat plates.

16. A method as claimed in claim 11, wherein said radially of the inner region occurs radially inward of a signal recording region of the optical information recording medium.

17. A method as claimed in claim 11, wherein at least one of the first and second substrates has a thickness of not more than 0.2 mm.

18. A method as claimed in claim 17, wherein the thickness is about 0.1 mm.

19. A method of manufacturing an optical information recording medium including a disk-like first substrate having a signal recording layer formed on one principal face of the disk-like first substrate and a disk-like second substrate, said method comprising:

bringing the disk-like first substrate and the disk-like second substrate into close contact with each other with radiation cure resin in between such that the signal recording layer is disposed between the disk-like first substrate and the radiation cure resin;

rotating the disk-like first and disk-like second substrates while the disk-like first and disk-like second substrates are being held in close contact with each other so as to form the disk-like first and disk-like second substrates integrally;

detecting a thickness of the radiation cure resin or a sum of the thickness of the radiation cure resin and a thickness of the second substrate at an inner region of the integral first and second substrates extending radially from a center of the first and second substrates;

when the thickness of the radiation cure resin or the sum of the thickness of the radiation cure resin and the thickness of the second substrate at the inner region reaches a preset value, irradiating the inner region to concurrently cure a portion of the radiation cure resin;

continuing the rotation of the first and second substrates so as to spread a remainder of the radiation cure resin between the integral first and second substrates; and irradiating, after said irradiation of the inner region, the integral first and second substrates so as to cure the remainder of the radiation cure resin.

20. A method as claimed in claim 19, wherein said irradiating of the inner region of the integral first and second substrates occurs radially inward of a signal recording region of the optical information recording medium.

21. A method as claimed in claim 19, further comprising detecting a thickness of the radiation cure resin or a sum of the thickness of the radiation cure resin and a thickness of the second substrate in at least one radial position other than the inner region, wherein when the thickness of the radiation cure resin or the sum at the radial position has reached a predetermined value, stopping said rotating of the integral first and second substrates and starting said radiating of the remainder of the radiation cure resin.

22. A method as claimed in claim 19, further comprising detecting a thickness of the radiation cure resin or a sum of the thickness of the radiation cure resin and a thickness of the second substrate in at least one radial position other than the inner region, wherein when the thickness of the radiation cure resin or the sum at the radial position has reached a predetermined value, said irradiation of the remainder of the radiation cure resin occurs while said rotating of the integral first and second substrates is continued.

23. A method as claimed in claim 19, further comprising detecting a thickness of the radiation cure resin or a sum of the thickness of the radiation cure resin and a thickness of the second substrate in at least one radial position other than the inner region, wherein when the thickness of the radiation cure resin or the sum at the radial position has reached a predetermined value, the radiation is irradiated to a neighborhood of the radial position while rotation of the integral first and second substrates is continued so as to cure the radiation cure resin in the neighborhood of the radial position.

24. A method as claimed in claim 19, wherein said irradiating of the inner region is performed by a spot light.

25. A method as claimed in claim 19, wherein said irradiating of the inner region comprises irradiating a radiation spot light to the inner region of the first and second substrates, and said irradiation of the remainder of the radiation cure resin comprises gradually displacing an irradiation position of the radiation spot light to an outer periphery of the first and second substrates so as to cure the remainder of the radiation cure resin.

26. A method as claimed in claim 19, wherein the second substrate has a thickness of not more than 0.2 mm.

27. A method as claimed in claim 26, wherein the thickness is about 0.1 mm.

28. A method as claimed in claim 19, wherein a translucent signal recording layer is provided on one principal face of the second substrate confronting the first substrate.

29. A method of manufacturing an optical information recording medium comprising a first substrate and a second substrate, said method comprising:

bringing the first substrate and the second substrate into close contact with each other with a radiation cure resin located in between the first substrate and the second substrate to integrally bond the first substrate and the second substrate;

rotating the first and second substrates;

measuring a thickness of the radiation cure resin at an inner region of the first substrate and the second substrate extending radially from a center of the first and second substrates;

when the thickness of the radiation cure resin at the inner region reaches a preset value, irradiating all of the inner region of the first substrate and the second substrate to concurrently cure only a portion of the radiation cure resin at the inner region; and irradiating the first substrate and the second substrate, after said irradiating of the inner region, to cure a remainder of the radiation cure resin.

30. A method according to claim 29, wherein said rotating of the first and second substrates is in a range of 300 to 6,000 rpm.

31. A method as claimed in claim 29, further comprising:

measuring a thickness of the radiation cure resin at an outer peripheral region of the first substrate and the second substrate, wherein when the thickness of the radiation cure resin at the outer peripheral region reaches a preset value, said irradiating of the the first and second substrates operation is performed.

* * * * *